(12) United States Patent
Balasubramanian

(10) Patent No.: US 9,819,424 B2
(45) Date of Patent: Nov. 14, 2017

(54) METHOD AND APPARATUS TO MITIGATE INTERFERENCE BETWEEN HARDWARE CIRCUITRY AND WIRELESS CIRCUITRY IN A WIRELESS COMMUNICATION DEVICE

(71) Applicant: Apple Inc., Cupertino (CA)

(72) Inventor: Sanjeevi Balasubramanian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 14/481,769

(22) Filed: Sep. 9, 2014

(65) Prior Publication Data

US 2015/0072627 A1 Mar. 12, 2015

Related U.S. Application Data

(60) Provisional application No. 61/875,454, filed on Sep. 9, 2013.

(51) Int. Cl.
*H04B 15/02* (2006.01)

(52) U.S. Cl.
CPC .................. *H04B 15/02* (2013.01)

(58) Field of Classification Search
CPC ........................................ H04B 15/00–15/06
See application file for complete search history.

(56) References Cited

U.S. PATENT DOCUMENTS

| | | | | |
|---|---|---|---|---|
| 5,630,224 A * | 5/1997 | Swail | ..................... | H04B 15/04 455/296 |
| 5,765,113 A * | 6/1998 | Russo | ..................... | H04B 15/04 455/296 |
| 5,842,037 A * | 11/1998 | Haartsen | ................ | H04B 15/04 375/219 |
| 6,381,476 B1 * | 4/2002 | Yoshida | ................. | H04B 15/04 340/7.51 |
| 7,209,767 B2 * | 4/2007 | Usui | ........................ | H04B 1/10 455/310 |
| 7,248,848 B2 * | 7/2007 | Matthews | .............. | H04B 15/04 327/295 |
| 7,327,988 B2 * | 2/2008 | Grabon | .................. | H04B 15/02 455/575.1 |

(Continued)

*Primary Examiner* — Gennadiy Tsvey
(74) *Attorney, Agent, or Firm* — Downey Brand LLP

(57) ABSTRACT

Methods and apparatus to mitigate radio frequency interference generated by hardware circuitry and received by wireless circuitry of a wireless communication device are described. A processor obtains a set of wireless performance metrics for signals received by the wireless circuitry. The processor determines a preferred operating mode for the hardware circuitry based on the set of wireless performance metrics and provides an indication of the preferred operating mode to the hardware circuitry. The hardware circuitry is configured for operation in accordance with the preferred operating mode. The processor and/or a second processor provide an indication to the wireless circuitry when the hardware circuitry initiates and terminates an operation that can cause radio frequency interference into the wireless circuitry. The wireless circuitry is configured during a time period that the hardware circuitry is operational to mitigate effects of radio frequency interference generated by the hardware circuitry.

20 Claims, 12 Drawing Sheets

(56) References Cited

U.S. PATENT DOCUMENTS

| | | | | |
|---|---|---|---|---|
| 7,801,207 B2* | 9/2010 | Chen | ............... | H04B 1/40 375/229 |
| 7,805,170 B2* | 9/2010 | Vishakhadatta | ..... | H04B 1/0475 455/343.1 |
| 8,027,673 B2* | 9/2011 | Rolf | ............... | H04B 15/00 455/425 |
| 8,189,881 B1* | 5/2012 | Smits | ............... | G06K 9/00026 340/5.53 |
| 8,583,130 B2* | 11/2013 | Rousselin | ............... | 455/13.4 |
| 2003/0153358 A1* | 8/2003 | Moon | ............... | H04B 7/0811 455/561 |
| 2006/0018372 A1* | 1/2006 | Chen | ............... | G06Q 10/10 375/219 |
| 2006/0018401 A1* | 1/2006 | Rush | ............... | H04B 1/1615 375/296 |
| 2006/0019686 A1* | 1/2006 | Rush | ............... | H04B 1/1615 455/501 |
| 2006/0072350 A1* | 4/2006 | Mitrosky | ............... | H02M 1/12 363/39 |
| 2008/0119140 A1* | 5/2008 | Maligeorgos | ............... | H04B 15/02 455/67.13 |
| 2011/0034132 A1* | 2/2011 | Babitch | ............... | H04B 15/02 455/76 |

* cited by examiner

METHOD AND APPARATUS TO MITIGATE INTERFERENCE BETWEEN HARDWARE CIRCUITRY AND WIRELESS CIRCUITRY IN A WIRELESS COMMUNICATION DEVICE

CROSS REFERENCE TO RELATED APPLICATIONS

This application claims the benefit of U.S. Provisional Application No. 61/875,454, filed Sep. 9, 2013 and entitled "METHODS AND APPARATUS FOR INTERFERENCE MITIGATION IN A WIRELESS COMMUNICATION DEVICE", which is incorporated by reference herein in its entirety for all purposes.

FIELD

The described embodiments relate generally to wireless communications and more particularly to facilitating in-device coexistence between radio frequency interference generating hardware circuitry and wireless circuitry in a wireless communication device.

BACKGROUND

Many modern wireless communication devices include one or more sets of wireless circuitry, which may also be referred to as radios and/or wireless subsystems herein. The multiple radios may be used by a wireless communication device to communicate independently and/or concurrently via multiple wireless communication technologies. The wireless communication technologies can use different radio frequency bands having different bandwidths and can accommodate signals at different receive signal strength levels. The wireless communication device can also include a variety of hardware circuitry to provide additional processing functions that enhance the user's experience of the wireless communication device. Modern wireless communication devices can be used for voice, video, text, data, media generation and consumption, Internet browsing, gaming, etc. In some instances, one or more different sets of hardware circuitry in the wireless communication device can generate radio frequency energy that can leak into a radio frequency band used by one or more receivers of the wireless circuitry. This energy leakage can raise the noise/interference floor and can cause a problem known as "de-sense." In many instances, de-sense can negatively impact the use of certain radio frequency bands and, in severe cases, can render certain radio frequency bands unusable. Accordingly, interference that can result in de-sense poses a problem for concurrent operation of wireless circuitry configured to receive low level radio frequency signals and hardware circuitry that generates radio frequency interference that overlaps with the receive radio frequency bands used by the wireless circuitry.

In a representative scenario, hardware circuitry in the wireless communication device, when in a particular operational state, can emit radio frequency energy that can impair reception of radio frequency signals by wireless circuitry while the wireless communication device is actively connected (or seeking to connect) with a wireless network. Proper reception of wireless radio frequency signals by the wireless circuitry can be affected by the radio frequency interference from the hardware circuitry, particularly when the radio frequency energy generated by the hardware circuitry is emitted at a relatively high interference level relative to the strength of received wireless radio frequency signals. Data packet errors can occur for received wireless radio frequency signals, and in extreme cases complete deafening of the wireless circuitry's radio frequency receiver can result from radio frequency interference generated by the hardware circuitry. Adjustments to operation of the hardware circuitry, the wireless circuitry, or both can be required in order to mitigate the effects of radio frequency interference between the hardware circuitry and the wireless circuitry to permit proper operation of each circuitry concurrently.

SUMMARY

Methods and apparatus to mitigate radio frequency interference between hardware circuitry and wireless circuitry of a wireless communication device are described. The wireless circuitry obtains a set of performance metrics, e.g., one or more of signal strength, signal quality, decoding error rates, etc., and determines a preferred mode of operation for hardware circuitry collocated in the wireless communication device. The wireless circuitry communicates the preferred mode of operation to the hardware circuitry, which determines an operational mode based on the preferred mode of operation to mitigate an amount and/or a level of radio frequency interference generated by the hardware circuitry while operational. The hardware circuitry can balance an amount of radio frequency interference generated when operational versus a performance level for the hardware circuitry to perform a function, e.g., time to complete the function, an accuracy of results for the function, a set of confidence limits for the function, etc. The hardware circuitry in turn communicates indications of its operating states to the wireless circuitry, e.g., start and stop indications when the hardware circuitry is operational and/or specific modes of operation. The wireless circuitry adapts its own operation based on the indications of the operating states of the hardware circuitry to mitigate radio frequency interference effects on radio frequency signal reception and decoding by the wireless circuitry.

This Summary is provided merely for purposes of summarizing some example embodiments so as to provide a basic understanding of some aspects of the subject matter described herein. Accordingly, it will be appreciated that the above described features and embodiments are merely examples and should not be construed to narrow the scope or spirit of the subject matter in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION

Figure 1:
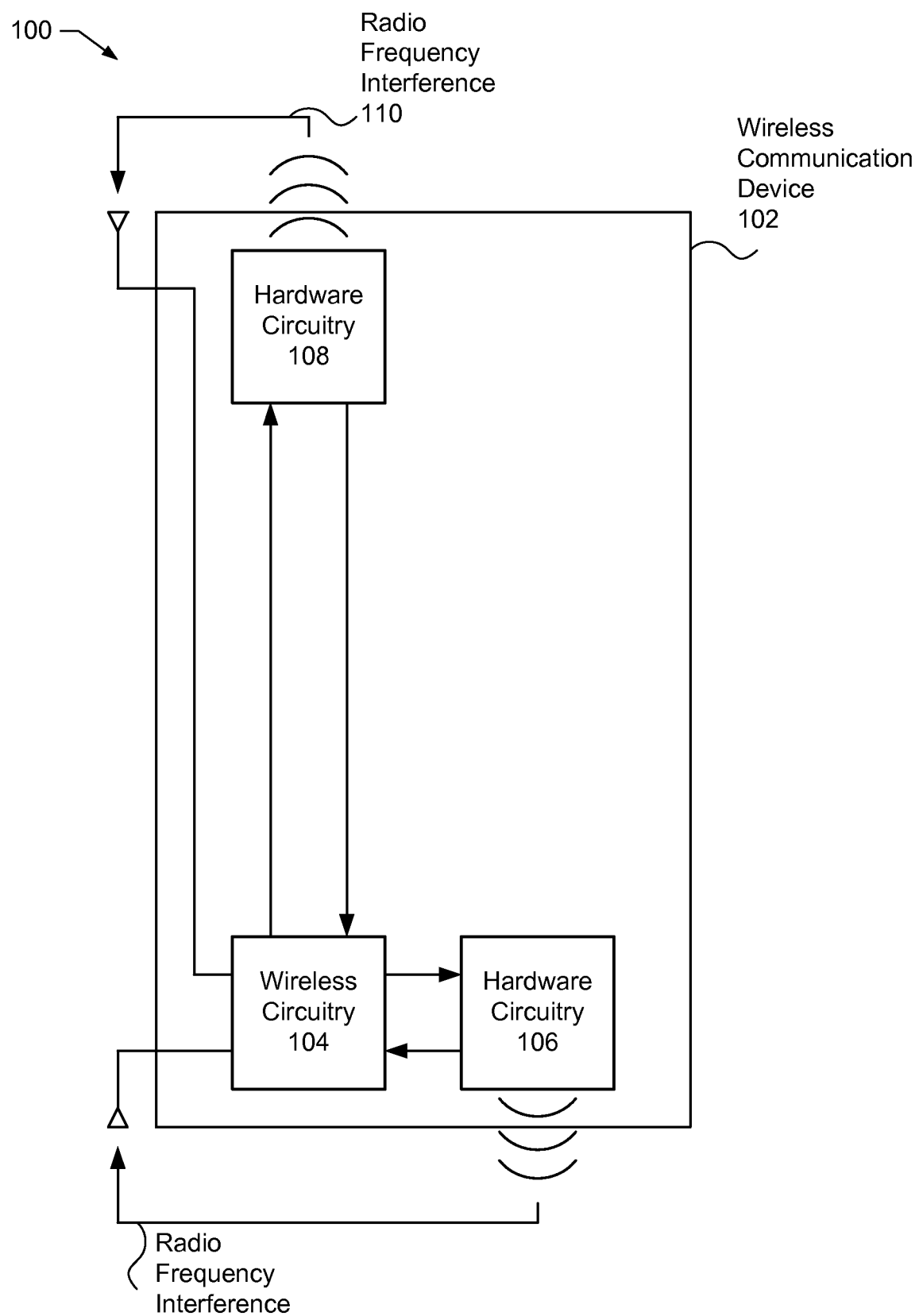
FIG. 1 illustrates an example of radio frequency interference between circuitry in a wireless communication device in accordance with some embodiments.

Methods and apparatus to mitigate interference between wireless circuitry (also referred to as a wireless subsystem and/or a wireless radio) and hardware circuitry (also referred to as a hardware subsystem) in a wireless communication device are disclosed. Interference between hardware circuitry and wireless circuitry can result from radio frequency energy emitted by the hardware circuitry being received by the wireless circuitry, e.g., due to spillover, higher order harmonics, intermodulation distortion, or other factors. A wireless controller associated with the wireless circuitry in the wireless communication device can monitor operating conditions to detect when the wireless circuitry can be vulnerable to radio frequency interference from collocated hardware circuitry in the wireless communication device. A hardware controller associated with the hardware circuitry in the wireless communication device can monitor operation of the hardware circuitry and can provide information to the wireless circuitry, e.g., through the wireless controller associated with the wireless circuitry, to indicate operating states of the hardware circuitry that can result in potential or actual radio frequency interference into radio frequency bands used by the wireless circuitry. The wireless controller associated with the wireless circuitry can provide information in turn to the hardware circuitry, e.g., through the hardware controller associated with the hardware circuitry, to request a preferred operating mode of the hardware circuitry that mitigates an impact on the wireless circuitry of interference of radio frequency energy emitted by the hardware circuitry. The wireless circuitry can determine the preferred operating mode based on various criteria, e.g., performance metrics for wireless signal reception and decoding and/or quality of service or other performance requirements for applications that use the wireless circuitry.

In some embodiments, a control processor in the wireless communication device can initiate wireless coexistence operations for the wireless circuitry and the hardware circuitry based on detection of a wireless interference condition. The control processor can provide information about wireless circuitry configurations to the hardware circuitry, including a preferred operating mode for the hardware circuitry, and can monitor ongoing operating conditions of the wireless circuitry and/or the hardware circuitry. The control processor can request the hardware circuitry to operate in a particular operating mode, and in some embodiments, can specify preferred power levels (which can correspond to different levels of radio frequency interference generated) and/or specific time periods (or "on/off" patterns) for operation of the hardware circuitry. The control processor can also request that the wireless circuitry operate in particular modes, e.g., enable receive diversity via multiple receive antennas to improve radio frequency receiver performance, modify packet reception times to avoid interference time periods, and/or modify receive data rates (e.g., to increase decoding headroom) in order to mitigate effects of interference from the hardware circuitry.

In other embodiments, the wireless circuitry includes a wireless controller and the hardware circuitry includes a hardware controller that communicates with the wireless controller. The wireless controller determines a preferred mode of operation for the hardware circuitry based on a set of wireless performance metrics (e.g., one or more of signal strength, signal quality, signal power, signal to interference plus noise ratio (SINR), bit error rate (BER), packet error rate (PER), etc.), and communicates the preferred mode of operation to the hardware controller. The wireless controller determines the preferred mode of operation for the hardware circuitry in order to mitigate the effects that radio frequency interference generated by the hardware circuitry while operational may have on reception and decoding of signals through the wireless circuitry.

The wireless circuitry can include one or more antennas. In some embodiments, the wireless controller can determine whether to operate using one antenna or multiple antennas. The wireless controller can enable or disable receive diversity for multiple antennas based on knowledge of operation of the hardware circuitry, based on estimates of actual or potential radio frequency interference generated by the hardware circuitry, and/or based on performance requirements of applications that use the wireless circuitry and run concurrently in the wireless communication device with operation of the hardware circuitry. For example, receive diversity can be enabled during time periods that the hardware circuitry is "on" and when the hardware circuitry generates radio frequency interference. Alternatively, the wireless controller can also disable the receive diversity when the hardware circuitry is "off". In some embodiments, the wireless controller can enable receive diversity based on an operating state of the hardware circuitry and on a power mode of the wireless communication device. For example, the wireless controller can enable receive diversity based on a number of factors that balance reducing power consumption of limited battery power with performance of signal reception and decoding by the wireless circuitry. In some embodiments, the wireless controller enables receive diversity, irrespective of operating states of the hardware circuitry, e.g., when the wireless communication device is powered through an external source, to improve performance.

In some embodiments, the wireless controller balances performance of the wireless circuitry and the hardware circuitry based on one or more user preferences, e.g., indications for power savings, for performance optimization, and/or for prioritization of operation in a higher performance/higher power consumption mode versus a lower performance/lower power consumption mode. In some embodiments, the wireless controller indicates preferred operating modes that include different time periods for operation of the hardware circuitry, e.g., a continuous operation mode when performance of the wireless circuitry satisfies (and/or is estimated to satisfy) certain performance metrics, and a discontinuous "pulsed" operation mode when performance of the wireless circuitry does not satisfy (and/or is estimated to not satisfy) certain performance metrics. In some embodiments, the wireless controller accounts for a set of applications operating on the wireless communication device, where different applications can require different levels of wireless performance to meet certain performance metrics (and/or quality of service metrics). For example, the wireless controller determines the preferred mode of operation based at least in part on a set of applications running concurrently on the wireless communication device, such as may operate concurrently with operation of the hardware circuitry and therefore may be affected by radio frequency interference generated by the hardware circuitry when operational.

In some embodiments, the hardware controller determines an operating mode for the hardware circuitry based on the preferred mode of operation provided by the wireless controller in order to mitigate the amount of radio frequency interference generated by the hardware circuitry while operational. Alternatively, the hardware controller can decide whether to honor the preferred mode of operation provided by the wireless controller or to select a different operating mode for the hardware circuitry, e.g., based on a set of user preferences and/or user settings. The hardware controller can balance an amount of radio frequency interference generated (and/or estimated to be generated) by the hardware circuitry with performance of the hardware circuitry for performing one or more functions. In some embodiments, the hardware controller communicates indications of operating states of the hardware circuitry to the wireless controller. The indications of the operating states of the hardware circuitry can indicate when the hardware circuitry is operational (e.g., a "start" time for an "on" operating state time period, and a "stop" time for an "off" operating state time period for the hardware circuitry). In some embodiments, the hardware controller can adapt operation of the wireless circuitry based on the actual and/or predicted operating states of the hardware circuitry to mitigate effects of radio frequency interference on signal reception and/or decoding of signals by the wireless circuitry when operating concurrently with the hardware circuitry. In some embodiments, operating states of the hardware circuitry can prompt changes operation of the wireless circuitry, e.g., by enabling receive diversity for multiple antennas to improve performance of wireless reception by the wireless circuitry, by changing requirements for data rates of applications that communicate via the wireless circuitry, by delaying transmission of packets and/or reception of packets via the wireless circuitry when actual or potential radio frequency interference from the hardware circuitry can occur.

Wireless circuitry of the wireless communication device can include transmitters and receivers that provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless circuitry can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry can be referred to herein as a radio and can include one or more components as described hereinabove. In some embodiments, the wireless circuitry can include a processor to determine settings for and/or configure operations of the wireless circuitry. The processor of the wireless circuitry, in some embodiments, can also communicate with other processors in the wireless communication device, e.g., a control processor, a host processor, an application processor, and/or a processor in the hardware circuitry.

Some example embodiments address in-device co-existence issues between wireless circuitry and other collocated hardware circuitry. Wireless communication devices can include multiple radios, each of which can implement one or more disparate wireless communication technologies, and an array of different hardware circuitry that can be collocated in the wireless communication device. For example, a cellular radio, such as a Long Term Evolution (LTE) radio, can coexist on a wireless communication device along with one or more other radio frequency wireless circuitry, such as a Bluetooth radio, WLAN (e.g., Wi-Fi) radio, and/or the like. In embodiments including a Wi-Fi Radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. The connectivity radio can use an ISM band. For example, Bluetooth can operate in the 2.4 GHz ISM band, while a WLAN radio can operate in the 2.4 GHz and/or 5 GHz ISM bands. The cellular radio and/or connectivity radio(s) can further coexist with a Global Navigation Satellite System (GNSS) radio, such as a Global Positioning System (GPS) radio, GLONASS radio, and/or other GNSS radio, which can operate in the 1.6 GHz band. Hardware circuitry collocated in the wireless communication device can include display elements, scanning devices, detection sensors, and/or other circuitry that can emit radio frequency energy in radio frequency bands that can be received by one or more antennas of wireless circuitry collocated in the wireless communication device.

FIG. 1 illustrates a representative interference scenario 100 in which a set of one or more hardware circuitry 106/108 collocated with wireless circuitry 104 can emit radio frequency interference 110 that can be received by one or more antennas (and thus by wireless transceivers) of the wireless circuitry 104 in the wireless communication device 102. Wireless circuitry 104 can include multiple antennas that can provide for receive diversity to improve performance of a downlink connection between the wireless communication device 102 and access network equipment of a wireless network. The multiple antennas can be positioned at different locations of the wireless communication device 102 to enable reception along different wireless communication paths. In some embodiments, a set of hardware circuitry 106 can be collocated in the wireless communication device 102 near the wireless circuitry 104. The hardware circuitry 106 can, when operational, emit radio frequency energy that can be picked up by one or more of the antennas of the wireless circuitry 104 and can cause interference with the proper reception and/or decoding of radio frequency signals received from the wireless network with which the wireless communication device 102 can be connected (or with which the wireless communication device 102 can be attempting to connect). In some embodiments, the wireless communication device 102 can include multiple antennas, e.g., as illustrated in FIG. 1, that can provide an alternate receive signal path to supplement (and/or substitute) for a primary signal path between the wireless communication device 102 and the wireless network. In some embodiments, the wireless communication device 102 can enable receive diversity to use multiple antennas to improve radio frequency signal reception, e.g., for improved performance of data rates and/or improved reliability of signal reception and decoding by the wireless circuitry 104 of the wireless communication device 102. Receive diversity can be an option for certain wireless communication protocols or can be required by other wireless communication protocols. When optional, the wireless communication device 102 can be configured, in some embodiments, to enable receive diversity based on a number of factors that balance performance of wireless circuitry 104 and power consumption, e.g., obtained from a battery contained in the wireless communication device 102. In some embodiments, wireless performance or battery performance can be prioritized, e.g., based on user preferences, a wireless network setting, and/or an operational requirement of one or more applications running on the wireless communication device 102. One or more controllers (included in the hardware circuitry and/or the wireless circuitry and/or as part of other components of the wireless communication device 102) can determine when operation of hardware circuitry 106 or 108 can (or is likely to) result in radio frequency interference 110 that can disrupt performance of the wireless circuitry 104. In some embodiments, the controllers can modify operation of the wireless circuitry 104 to mitigate effects of the interference, e.g., by enabling receive diversity from multiple antennas, change requirements for data rates (lower data rates being less vulnerable) of one or more applications that communicate via the wireless circuitry, change requirements for reception (delay packets when possible to avoid interference), and/or change timing of signaling via the wireless circuitry 104 to minimize interference. In some embodiments, the controllers can modify operation of the hardware circuitry 106/108 to mitigate effects of radio frequency interference 110 with the collocated wireless circuitry 104, e.g., by altering when the hardware circuitry 106/108 is operational, by changing a duty cycle of operation of the hardware circuitry 106/108, by changing an operational characteristic of specific hardware elements in the hardware circuitry 106/108 (e.g., change a bias level and/or operating point of one or more amplifiers) to alter the radio frequency interference. The controllers can communicate between the wireless circuitry 104 and the hardware circuitry 106/108 to provide an indication of preferred operating modes for the other circuitry and/or current operational states of the particular circuitry. The wireless circuitry 104 and/or the hardware circuitry 106/108 can account for information provided by the controllers to set their own operating states to mitigate the extent (and/or the effects) of radio frequency interference 110.

Figure 2:
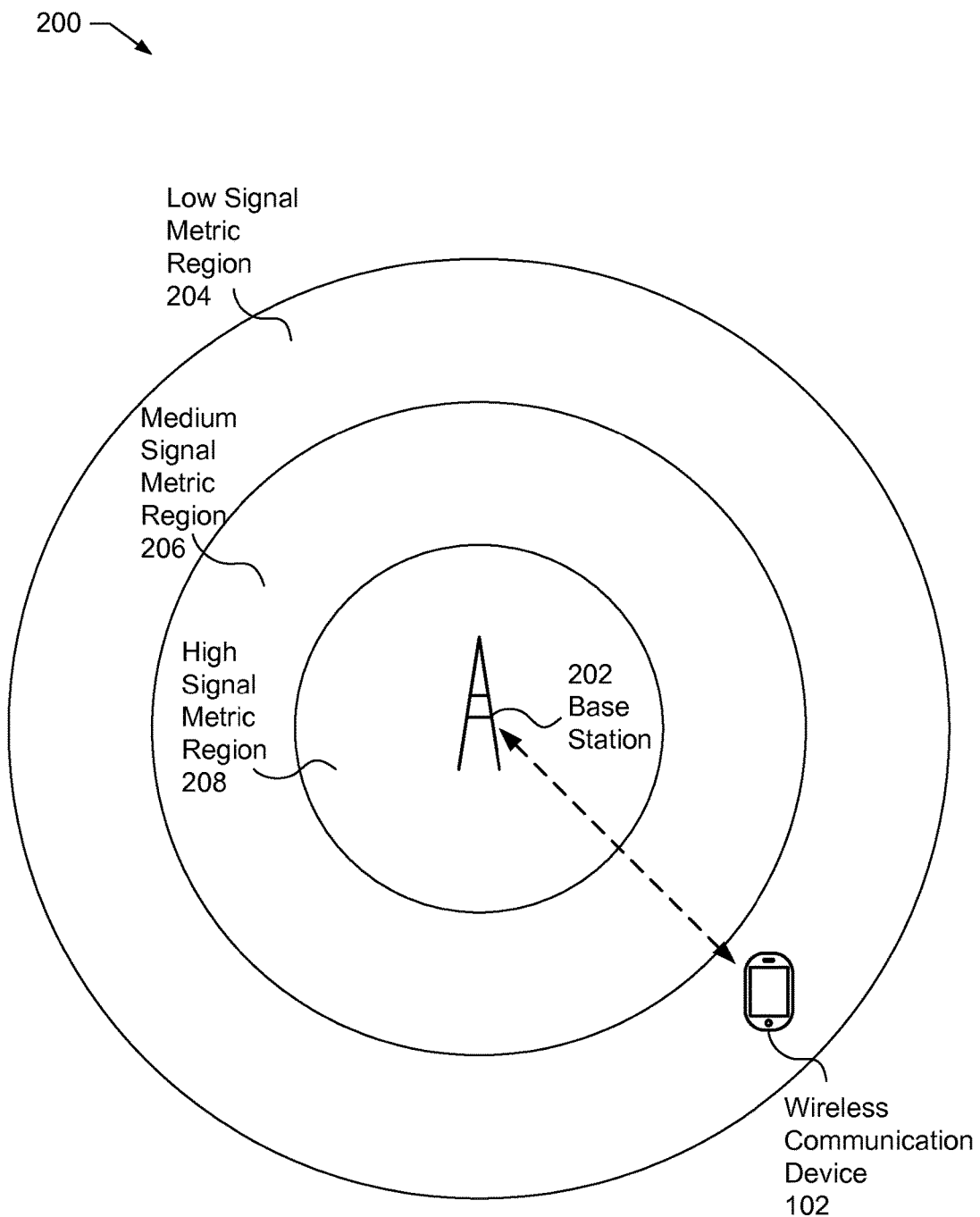
FIG. 2 illustrates a set of regions corresponding to different signal metrics for the wireless communication device in accordance with some embodiments.

FIG. 2 illustrates a diagram 200 of a set of regions that correspond to different levels of signal metrics for the wireless communication device 102 relative to a distance from a base station 202 of a wireless network in accordance with some embodiments. The base station 202 can represent a network element that provides network access to the wireless network and can also be referred to as a base transceiver station, a wireless network access subsystem, an access network system, a global system for mobile communications (GSM) edge radio access network (GERAN) element, a universal mobile telecommunications system (UMTS) terrestrial radio access network (UTRAN) element, a evolved UTRAN (eUTRAN) element, or other term that refers to a set of network equipment in the access network portion of the wireless network to which the wireless communication device 102 sends and receives radio frequency signals. As radio frequency energy decays in proportion to the square of the distance from a transmitting end, e.g., the base station 202, to a receiving end, e.g., the wireless communication device 102 can receive signals that vary in signal strength across a wide range of values based on a position of the wireless communication device 102 relative to the base station 202. Throughout a geographic area covered by the base station 202, a signal strength received by the wireless communication device 102 can vary by as much as 70 to 80 dB in some embodiments. A wireless receiver in the wireless circuitry 104 of the wireless communication device 102 can be configured to receive wireless signals as low as −130 dBm for cellular communication and as low as −160 dB for global positioning navigation (GPS). The wireless circuitry 104 can receive radio frequency signals in different radio frequency bands according to different wireless communication protocols, e.g., GSM, UMTS, CDMA2000, LTE, LTE-Advanced, Wi-Fi, Bluetooth, etc. Hardware circuitry 106/108 in the wireless communication device 102 can generate radio frequency energy that leaks into one or more radio frequency bands used by the wireless circuitry 104 for communication in accordance with one or more different wireless communication protocols. Even relatively small amounts of radio frequency energy can interfere with the reception of low-level radio frequency signals by the wireless circuitry 104. In addition, the wireless communication device 102 can receive additional noise and interference, e.g., due to multipath reflections, which can inhibit the performance of the wireless circuitry 104. In some embodiments, the wireless communication device 102 can obtain a set of radio frequency signal metrics to monitor and can associate with different performance thresholds different operating regions that correspond to different signal strengths, signal quality, or a combination of these.

FIG. 2 illustrates a representative set of regions for which a signal strength metric can vary. Signal strength is only one performance metric that the wireless communication device 102 can use to determine actions to take for radio frequency interference mitigation, and other performance metrics can also be used. The wireless communication device 102 can associate a set of signal strength values (or another set of signal metrics) with a particular region in which the wireless circuitry 104 and/or the hardware circuitry 106/108 can be configured to operate accordingly to mitigate radio frequency interference effects on wireless circuitry 104 performance. In an embodiment, a range of values for a signal strength metric can be associated with a "high" signal metric region 208. Typically, the mobile wireless communication device 102 can receive relatively high signal strengths when operating in a geographic area closer to the base station 202. In some embodiments, a signal quality metric can be used in addition to and/or in place of the signal strength metric, and a high signal quality region (or high signal metric region) can be associated with a set of high values for a signal quality and/or signal strength. Another range of signal strength values can be associated with a "medium" signal metric region 206, and a further range of signal strength values can be associated with a "low" signal metric region 204. In an embodiment, when the wireless communication device 102 operates in a "high" signal metric region 208, the hardware circuitry 106/108 can be configured to operate for maximum performance, e.g., prioritize performance of functions of the hardware circuitry over mitigation of radio frequency interference. For example, the hardware circuitry 106/108 can be configured to operate at full power and/or continuously for a short period of time to achieve a function with a highest level of accuracy in a shortest operational time. The signal strength levels received from the base station 202 in the "high" signal metric region 208 can be sufficiently high that the wireless circuitry 104 can operate properly in the presence of a maximum level of radio frequency interference generated by the hardware circuitry 106/108. In an embodiment, when the wireless communication device 102 operates in a "medium" signal metric region 206, the hardware circuitry 106/108 can be configured to operate for a medium level of performance, e.g., balance performance of the hardware circuitry with mitigation of radio frequency interference that can affect the wireless circuitry 104. For example, the hardware circuitry 106/108 can be configured to operate at a lower power level, and/or for a different amount of time. In some embodiments, the hardware circuitry 106/108 can be configured to operate in a discontinuous, pulsed mode that alternates "on" time periods and "off" time periods. The "medium" signal metric region 206 can correspond to a range of receive signal strength metrics and/or receive signal quality metrics that provide for an acceptable but less than optimal level of performance by the wireless circuitry 104. In the "medium" signal metric region 206, the wireless circuitry 104 can be more vulnerable to radio frequency interference 110 than when operating in the "high" signal metric region 208. In an embodiment, in the "medium" signal metric region 206, the hardware circuitry 106/108 can be configured to operate with "on" time periods (during which radio frequency interference can occur) interspersed with "off" time periods during which the wireless circuitry 104 can receive signals without radio frequency interference from the hardware circuitry 106/108. The discontinuous, pulsed mode of operation that intersperse "on" and "off" time periods can allow for an acceptable (if less than optimal) level of performance for the wireless circuitry 104. In some embodiments, the hardware circuitry 106/108 can be required to operate for a longer overall time period when a mixture of "on" time periods and "off" time periods are used. The "off" time periods can provide "quiet" periods during which the wireless circuitry 104 can receive radio frequency signals without concurrently receiving radio frequency interference from the hardware circuitry 106/108. In an embodiment, when the wireless communication device 102 operates in a "low" signal metric region 204, the hardware circuitry 106/108 can be configured to use a greater proportion of and/or longer "off" time periods than used when operating in the "medium" signal metric region 206. In the "low" signal metric region 204, the wireless circuitry 104 can be most vulnerable to radio frequency interference, as the receive signal strength and/or receive signal quality can be relatively low, resulting in poor reception and/or decoding of the wireless radio frequency signals received from the base station 202. In some embodiments, operation of the hardware circuitry 106/108 can result in the wireless circuitry 104 being unable to reliably receive radio frequency signals from the base station 202. In an embodiment, the hardware circuitry 106/108 can be configured to introduce more "off" time periods, and/or to provide for other adjustments that lower and/or eliminate radio frequency interference to permit the wireless circuitry 104 to receive signals reliably from the base station 202. In some embodiments, the length of time of the "on" time periods and/or the "off" time periods can be adjusted and/or set to ensure proper operation of the hardware circuitry 106/108 and/or proper operation of the wireless circuitry 104. The length of time of an "on" time period for the hardware circuitry 106/108 can determine an amount of time during which signal reception by the wireless circuitry 104 can be impaired, in some cases significantly so. In an embodiment, the length of time of the "on" time period for the hardware circuitry 106/108 is equal to or less than an amount of time required to ensure proper decoding of a packet data unit by the wireless circuitry 104 at an acceptable error rate. In some embodiments, the length of time of the "on" time period is less than one half the length of time of a wireless data packet unit received (and/or expected to be received) by the wireless circuitry 104. In an embodiment, the length of the time of the "off" time period is equal to or greater than an amount required to ensure proper decoding of a packet data unit received (and/or expected to be received) by the wireless circuitry 104 at an acceptable error rate. In some embodiments, the length of time of the "off" time period is more than one half the length of time of the wireless data packet unit. In some embodiments, the length of time of the "on" time period and/or the length of time of the "off" time period varies based on an error correction capability that the wireless circuitry 104 applies to received radio frequency packet data units. In some embodiments, the length of time of the "on" time periods and/or the "off" time periods is based on a target packet error rate, a target bit error rate, a signal strength threshold, a signal quality threshold, or a combination of these for reception of packet data units through the wireless circuitry 104.

Figure 3A:
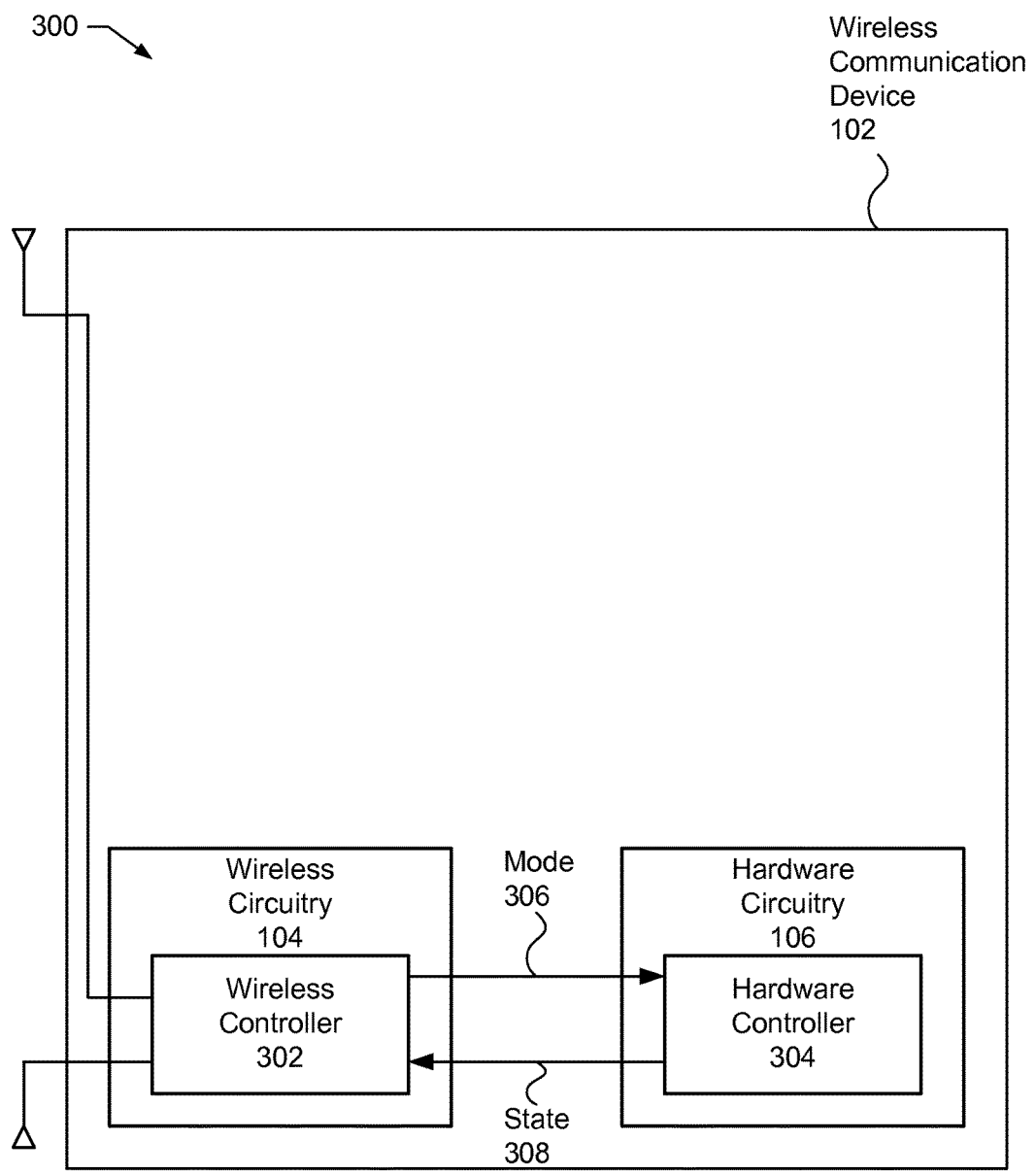
FIG. 3A illustrates an architecture for facilitating in-device coexistence between wireless circuitry and hardware circuitry in a wireless communication device in accordance with some embodiments.

FIG. 3A illustrates a representative architecture 300 for facilitating co-existence between wireless circuitry 104 and hardware circuitry 106 in the wireless communication device 102. A wireless controller 302 contained in and/or associated with the wireless circuitry 104 can communicate an operating mode to the hardware controller 304 contained in and/or associated with the hardware circuitry 106. The wireless controller 302 can determine a preferred operating mode 306 for the hardware circuitry 106 that can provide for proper operation and/or to mitigate radio frequency interference when the hardware circuitry 106 operates in accordance with the preferred operating mode 306. In some embodiments, the wireless controller 302 selects the preferred operating mode 306 for the hardware circuitry 106 based on a measurement of or an estimate of one or more performance metrics for signals received by the wireless circuitry 104 of the wireless communication device 102. The wireless controller 302 can periodically monitor performance of radio frequency signal strength, signal quality, and/or packet/bit decoding performance to determine a preferred operating mode 306 for the hardware circuitry 106.

The wireless controller 302 can communicate the preferred operating mode 306 to the hardware controller 304 at regular and/or irregular time intervals (e.g., in response to polling, based on timers, and/or based on performance conditions). In some embodiments, the wireless controller 302 accounts for a set of applications that are operating (and/or scheduled to operate) on the wireless communication device 102, e.g., different applications can require different levels of radio frequency performance, and can determine the preferred operating mode 306 based at least in part on a set of applications running concurrently on the wireless communication device 102. In some embodiments, the wireless controller 302 can account for a powering mode of the wireless communication device 102 and can select a preferred operating mode 306 for the hardware circuitry 106 based at least in part on the powering mode of the wireless communication device 102. In some embodiments, the wireless controller 302 can include a user preference to determine the preferred operating mode 306 of the hardware circuitry 106. For example, the wireless controller 302 can balance performance of the radio frequency wireless circuitry 104 with performance of the hardware circuitry 106 based on one or more user preferences, e.g., for power saving, for performance optimization, and/or for prioritization of operations. The hardware controller 304 can receive the preferred operating mode 306 from the wireless controller 302 and can select to operate in accordance with the preferred operating mode 306 received from the wireless controller 302. In some embodiments, the hardware controller 304 accounts for user preferences and/or user settings to determine whether to honor the preferred operating mode 306 communicated by the wireless controller 302 or to select a different operating mode for the hardware circuitry 106. In general, the hardware circuitry 106 can balance performance of the function provided by the hardware circuitry (e.g., how quickly and/or accurately the hardware circuitry 106 operates) with requirements to minimize and/or mitigate radio frequency interference into the wireless circuitry 104. The hardware controller 304 can communicate an operating state 308 to the wireless controller 302. In some embodiments, the hardware controller 304 communicates an indication when the hardware circuitry 106 is in an "on" operating state and when the hardware circuitry 106 is in an "off" operating state. In some embodiments, the hardware controller 304 communicates a first indication when the hardware circuitry 106 initiates an operation and communicates a second indication when the hardware circuitry 106 completes the operation. The wireless controller 302 can determine an operating state of the wireless circuitry 104 at least in part based on the operating state 308 information provided by the hardware controller 304. In a representative embodiment, the wireless controller 302 enables receive diversity (if not already enabled) when the hardware circuitry 106 is "on" and/or when the hardware circuitry 106 is performing a particular operation. The wireless controller 302 can disable receive diversity when the hardware circuitry 106 is "off" and/or when the hardware circuitry 106 is not performing the particular operation and/or when the particular operation is complete. In some embodiments, the wireless controller 302 can determine to enable receive diversity depending on both an operating state 308 of the hardware circuitry 106 and a powering mode of the wireless communication device 102. In some embodiments, when the wireless communication device 102 is powered through an external source, receive diversity can be enabled irrespective of the hardware circuitry 106 state. The wireless controller 302 can balance reducing power consumption of limited battery power with an actual or predicted performance for the wireless circuitry 104. In an embodiment, the wireless controller 302 associates a range of wireless performance metrics (e.g., signal strength, signal quality, decoding error rates, etc.) with a preferred operating mode 306 of the hardware circuitry 106. The wireless controller 302 can determine a present performance metric for the wireless circuitry 104 and can communicate an associated preferred operating mode 306 to the hardware controller 304. FIG. 2 provides an illustration of three different regions in which a different preferred operating mode 306 can be selected and communicated to the hardware controller 304 by the wireless controller 302 when the wireless communication device 102 operates in a particular region. It should be understood that the three regions are merely representative and that fewer or more regions can be included and used.

Figure 3B:
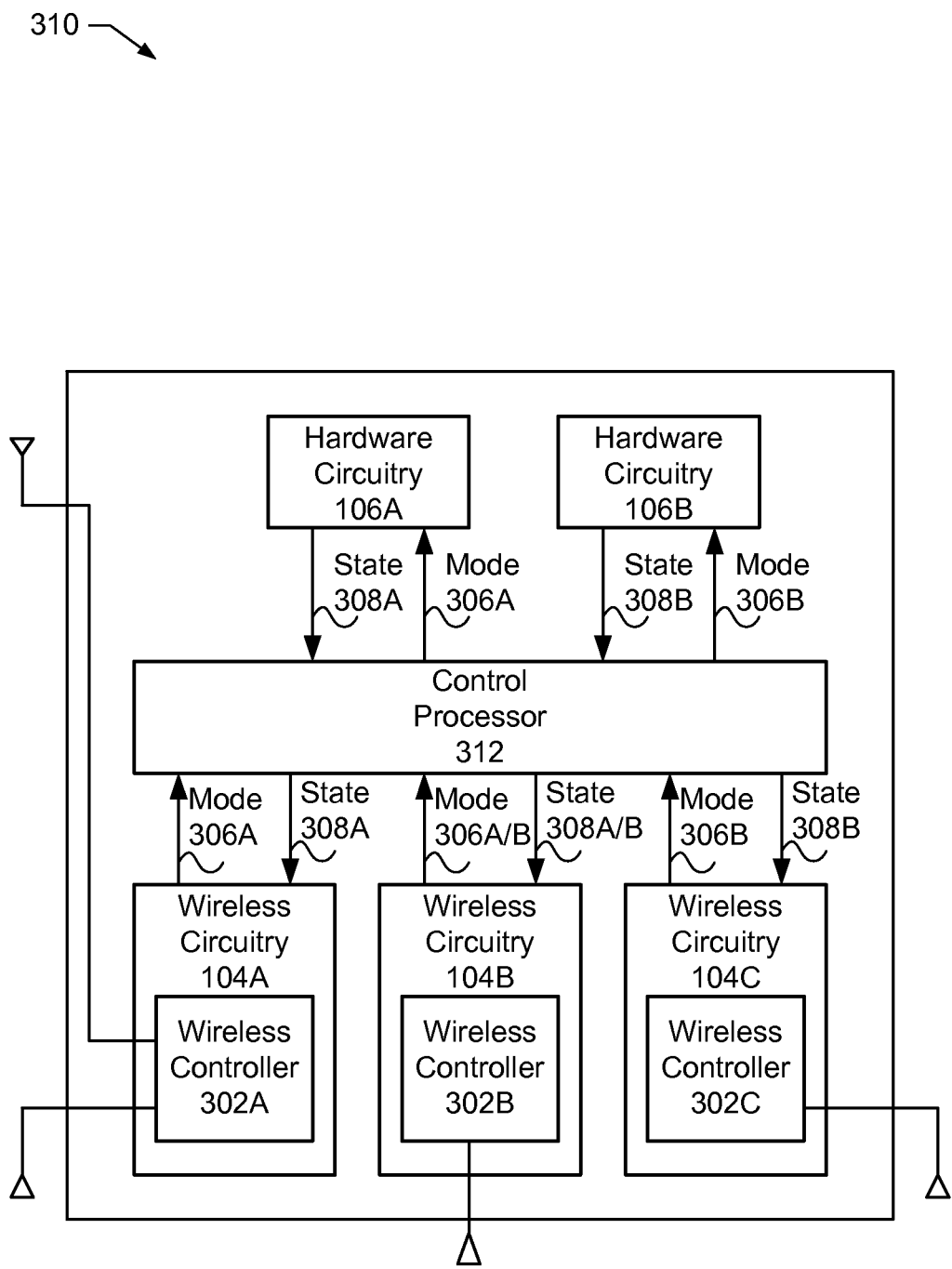
FIG. 3B illustrates another architecture for facilitating in-device coexistence between wireless circuitry and hardware circuitry in a wireless communication device in accordance with some embodiments.

FIG. 3B illustrates another architecture 310 for facilitating in-device coexistence between wireless circuitry 104 and hardware circuitry 106 in a wireless communication device 102. The wireless communication device 102 can include multiple sets of wireless circuitry 104, which can provide wireless communication capability in accordance with different wireless communication protocols. For example, the wireless communication device 102 can include a first wireless circuitry 104A, which in turn includes a wireless controller 302A, that provides for wireless cellular communication in accordance with one or more cellular wireless communication protocols, e.g., GSM, UMTS, CDMA, LTE, etc. The wireless controller 302A can manage wireless communication by the wireless circuitry 104A including use of multiple antennas for receive diversity. The wireless communication device can also include wireless circuitry 104B with a wireless controller 302B that can provide for a separate set of wireless communication in parallel with the wireless circuitry 104A, e.g., to provide wireless local area network (WLAN) and/or wireless personal area network (WPAN) communication in accordance with one or more WLAN and/or WPAN wireless communication protocols, e.g., Wi-Fi and Bluetooth. The wireless communication device 102 can also include wireless circuitry 104C with wireless controller 302C that can provide for reception of global satellite navigation signals (GLONASS) such as provided by global positioning systems (GPS). The operating radio frequency ranges for each of the wireless circuitry 104A/B/C can vary, and the level of signals received can also vary. The wireless circuitry 104A/B/C can communicate through a common control processor 312 with one or more sets of hardware circuitry, e.g., 106A and 106B as illustrated in FIG. 3B. The wireless circuitry 104 can communicate a preferred operating mode 306A for one or more of the hardware circuitry 106A/B. In some embodiments, select hardware circuitry 106A/B can operate and cause radio frequency interference with all or with only a subset of the wireless circuitry, e.g., 104A or 104B or 104C. In an embodiment, the wireless circuitry 104 communicates the preferred operating mode for the hardware circuitry 106 with which radio frequency interference can occur. For example, the hardware circuitry 106A can cause interference with wireless circuitry 104A but not with wireless circuitry 104B or 104C, and in this instance, the wireless circuitry 104A can provide preferred operating mode 306A for hardware circuitry 106A while wireless circuitry 104B and 104C cannot provide preferred operating mode information for the hardware circuitry 106A. Similarly the hardware circuitry 106 can provide operating state information 308 to the control processor 312 which can in turn communicate the information to the wireless controller 302 for the wireless circuitry 104 that can be affected by the operation of the hardware circuitry 106. In some embodiments, the control processor 312 can consolidate preferred operating modes from the different wireless circuitry 104 and provide a consolidated preferred operating mode 306 to the hardware circuitry 106. In some embodiments, the control processor 312 can consolidate the operating state information from the hardware circuitry 106 and provide consolidated operating state information to the wireless circuitry 104. As illustrated in FIG. 3B, in an embodiment, the wireless circuitry 104A can provide preferred operating mode 306A for hardware circuitry 106A and obtain operating state information 308A from hardware circuitry 106A but not require information from or provide information to hardware circuitry 106B. Similarly, the wireless circuitry 104C can provide preferred operating mode 306B for hardware circuitry 106B and obtain operating state information 308B from hardware circuitry 106B but not require information from or provide information to hardware circuitry 106A. In an embodiment, the wireless circuitry 104B can provide preferred operating modes 306A/B for both hardware circuitry 106A/B and obtain operating state information 308A/B from both hardware circuitry 106A/B. In some embodiments, the control processor consolidates and/or translates information to provide the operating state information 308 and/or the preferred operating mode 306 information according to requirements for the respective hardware circuitry 106 and/or for the respective wireless circuitry 104.

Figure 3C:
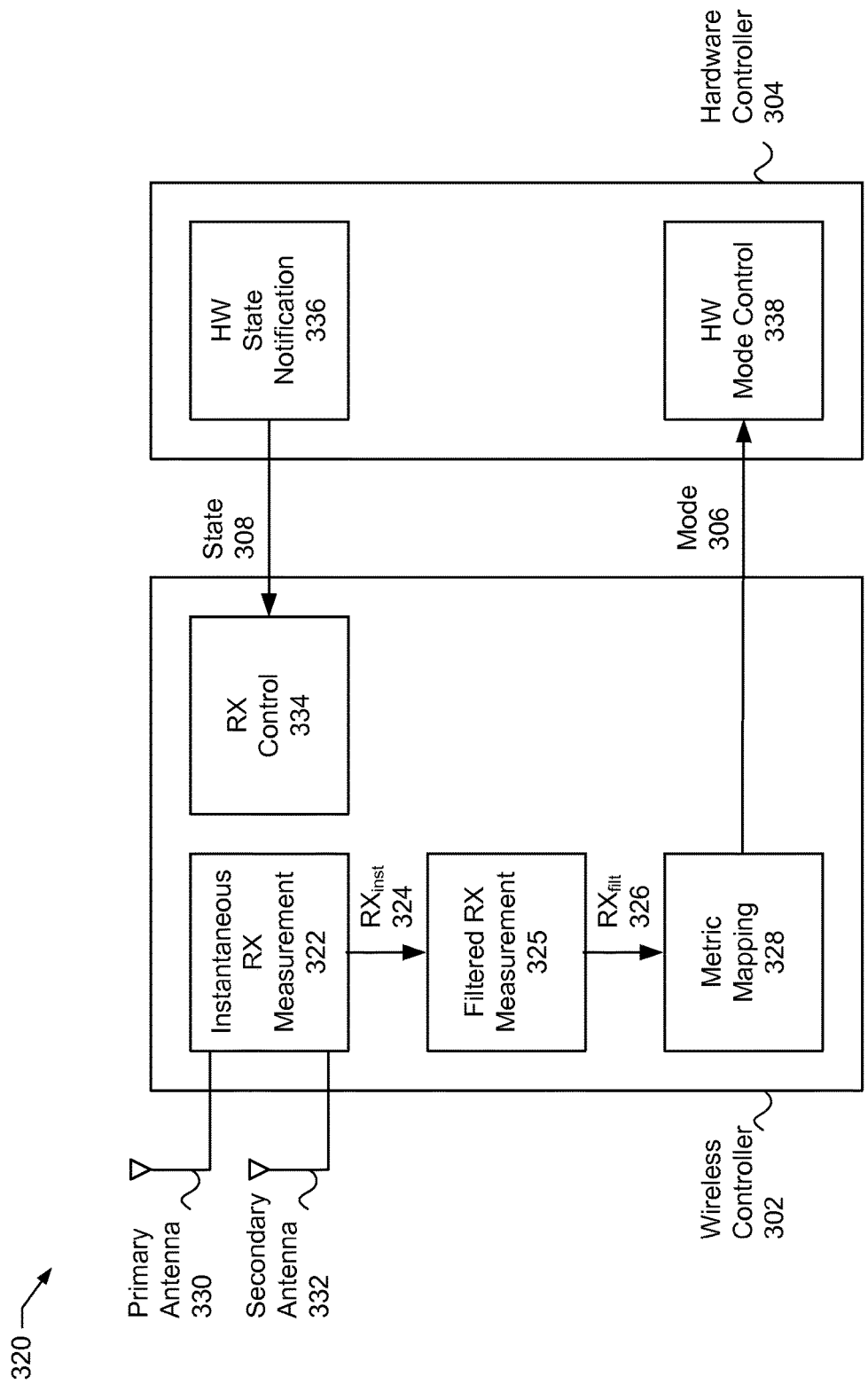
FIG. 3C illustrates a further architecture for facilitating in-device coexistence between wireless circuitry and hardware circuitry in a wireless communication device in accordance with some embodiments.

FIG. 3C illustrates a further architecture 320 for facilitating in-device coexistence between wireless circuitry 104 and hardware circuitry 106 in a wireless communication device 102. The wireless controller 302 in the wireless communication device 102 can communicate a preferred operating mode 306 to a hardware controller 304, while the hardware controller 304 can communicate an operating state 308 to the wireless controller 302. The wireless controller 302 can be associated with wireless circuitry 104, and the hardware controller can be associated with hardware circuitry 106 of the wireless communication device 102. The wireless circuitry can include a primary antenna 330 and a secondary antenna 332 through which radio frequency signals can be transmitted and/or received by the wireless circuitry 104 to communicate with a wireless network. In some embodiments, the wireless controller 302 can determine whether to operate with the primary antenna 330 alone, the secondary antenna 332 alone, or with both the primary and secondary antennas 330/332 in parallel. In some embodiments, the wireless controller 302 accounts for one or more of operating performance of the wireless circuitry 104, a powered state of the wireless communication device 102, and/or an operating state 308 of the hardware circuitry 106 (e.g., as communicated by the hardware controller 304) to determine which antennas 330 and/or 332 to use. The wireless controller 302 can receive wireless radio frequency signals through one or more of the antennas 330/332 and provide an instantaneous receive (RX) signal measurement (metric) 324, e.g., generated by the instantaneous RX measurement module 322 and indicated as $RX_{inst}$ 324 in FIG. 3C. In some embodiments, receive signal levels and/or receive signal quality can be measured. In representative embodiments, a receive signal metric can include a receive signal strength indicator (RSSI), a reference signal received power (RSRP), a reference signal code power (RSCP), a reference signal received quality (RSRQ), a signal to interference plus noise ratio (SINR), a bit error rate (BER), a packet error rate, a pilot channel energy to noise ratio (Ec/Io), or any other appropriate signal strength or signal quality metric that can provide information about receive radio frequency signal operating conditions experienced by the wireless communication device 102. The wireless controller 302 can filter the instantaneous receive metric 324 through a filtered RX measurement module 325 to provide a filtered receive metric indicated as $RX_{filt}$ 326 in FIG. 3C. Smoothing of the instantaneous receive signal metrics can provide for averaging over a period of time or through other filter functions. A receive signal metric mapping module 328 can determine a preferred operating mode 306 based on the filtered receive metric 326. In some embodiments, the filtered receive metric 326 is a set of receive signal metrics. In some embodiments, the preferred operating mode is selected from a set of preferred operating modes based on a mapping of the set of receive signal metrics, e.g., contained in a table or by use of a formula. In some embodiments, the set of preferred operating modes is discrete (e.g., a set of individual operating modes), while in some embodiments, the set of preferred operating modes 306 is continuous (e.g., a "setting" and/or a range or acceptable or preferred operating conditions). In an embodiment, a range of values for a receive signal metric (or set of metrics) can be associated with a preferred operating mode 306. For example, when a receive signal metric falls within a first range of values, a first preferred operating mode 306 for the hardware circuitry 106 can be selected. When the receive signal metric falls within a second range of values, a second preferred operating mode 306 for the hardware circuitry 106 can be selected, etc. A hardware mode control module 338 in the hardware controller 304 can obtain the preferred operating mode 306 from the wireless controller 302 (e.g., in response to an interrupt, by polling, by receiving a message, or by another means of communication) and can determine an operating mode for the hardware circuitry 106 of the wireless communication device 102 based at least in part on the preferred operating mode 306. In some embodiments, the hardware controller 304 adjusts an operational state of the hardware circuitry 106 in accordance with the preferred operating mode 306. A hardware state notification module 336 in the hardware controller 304 can communicate operating state information 308 to the wireless controller 302. In some embodiments, the hardware controller 304 indicates when a particular operation (or a particular set of operations) is active in the hardware circuitry 106, e.g., those operations that can produce radio frequency interference 110 that can affect operation of the wireless circuitry 104. In some embodiments, the hardware state notification module 336 provides an "on" indication for when elements of the hardware circuitry 106 are operating in a condition that can generate radio frequency interference 110 and an "off" indication for when the elements are not operating. In some embodiments, the hardware state notification module 336 provides a "start" indication for when a particular operation of the hardware circuitry 106 begins and a "stop" indication for when the particular operation of the hardware circuitry 106 ends, where the particular operation of the hardware circuitry 106 can generate a level of radio frequency interference 110 that can affect operation of the wireless circuitry 104. The wireless controller 302 can include a receive control module 334, which can obtain the operating state information 308 from the hardware controller 304 and can determine operating conditions of the wireless circuitry 104 in accordance with the obtained operating state information 308 of the hardware circuitry 106. In an embodiment, the receive control module 334 can enable one or more operating conditions of the wireless circuitry 104 that can improve performance in the presence of radio frequency interference 110 based on the operating state information 308 from the hardware circuitry 106. In an embodiment, the receive control module 334 can enable receive diversity for multiple antennas 330/332 during a time period that the hardware circuitry 106 can generate radio frequency interference 110. In some embodiments, the receive control module 334 can alter a data rate requirement for one or more applications to minimize an impact of radio frequency interference 110 generated by the hardware circuitry 106. In an embodiment, the receive control module 334 can enable receive diversity to assist with overcoming radio frequency interference when a radio access technology (RAT) used by the circuitry 104 allows for operating with receive diversity and/or when a powering state of the wireless communication device 102 permits use of parallel radio frequency hardware (or other power intensive operations), e.g., when the wireless communication device 102 is powered by an external source and/or at a high level of battery power is available.

Figure 4:
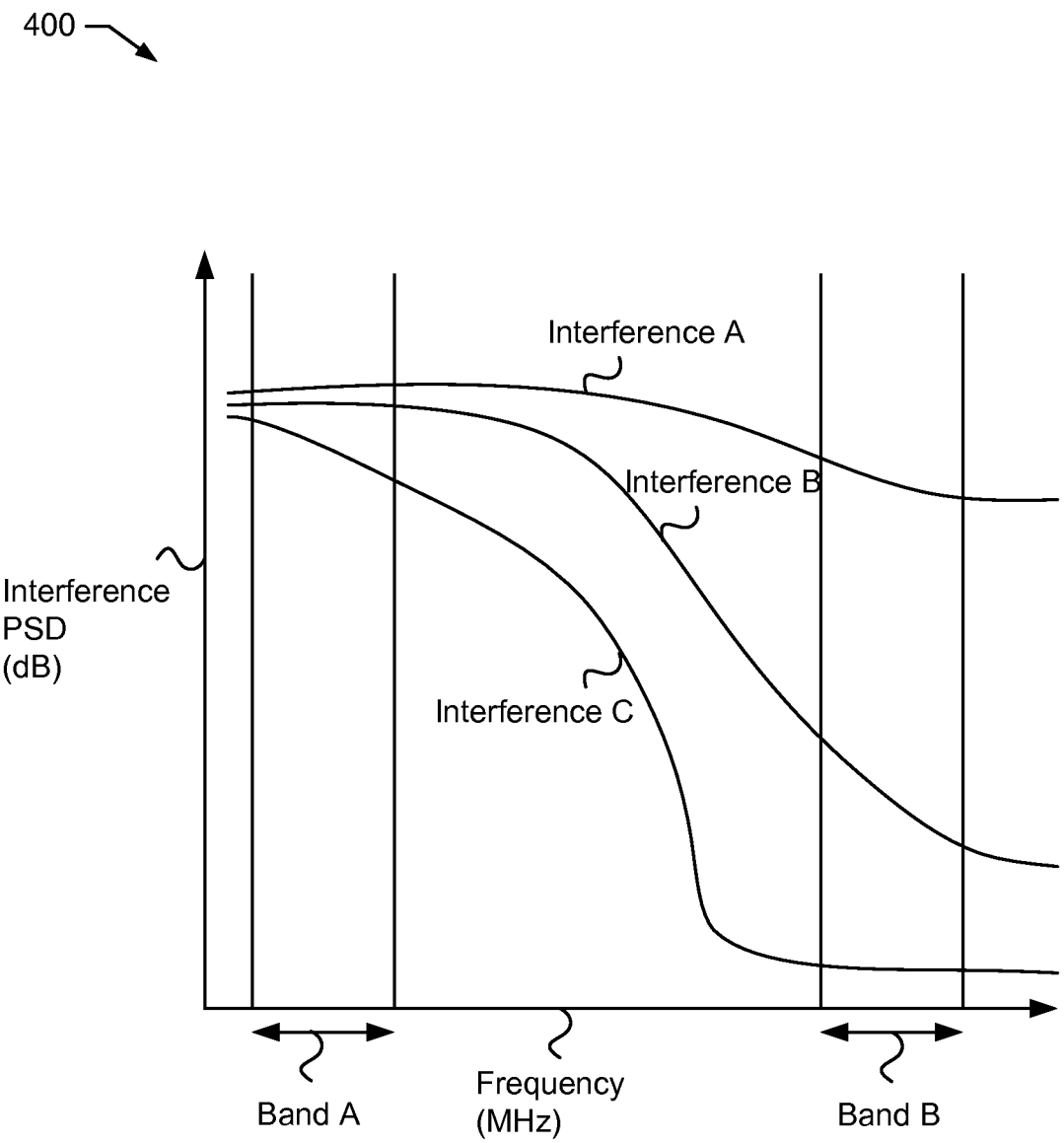
FIG. 4 illustrates a set of representative interference levels across different radio frequency bands in accordance with some embodiments.

FIG. 4 illustrates a diagram 400 of set of representative interference levels across different radio frequency bands in accordance with some embodiments. An amount of radio frequency interference 110 can vary across different radio frequencies, and different wireless communication protocols and/or wireless circuitry 104 can operate using one or more different radio frequency bands. In some embodiments, the wireless controller 302 accounts for radio frequency bands used by the wireless circuitry 104 to determine preferred operating modes 306 for hardware circuitry 106 of the wireless communication device 102. As shown in FIG. 4, an interference level within a range of radio frequencies, e.g., Band A, can differ from an interference level within a different range of radio frequencies, e.g., Band B, for the same radio frequency generating interference 110. In an embodiment, hardware circuitry 106 can generate a relatively high level of radio frequency interference 110, illustrated as interference A, in both Band A and in Band B. The wireless controller 302, in this instance for interference A, can determine the same preferred operating modes for the hardware circuitry 106 irrespective of whether the wireless circuitry 104 uses Band A or Band B, as interference A can have comparable effects. In another embodiment, the hardware circuitry 106 can generate a high level of radio interference 110 in Band A and a lower level of interference in Band B, illustrated as interference B. In this instance, the wireless controller 302 can seek to mitigate interference when operating in Band A for a broad range of receive signal performance metrics, while electing to mitigate interference when operating in Band B over a narrower range of receive signal performance metrics. In a further embodiment, the hardware circuitry 106 can generate a high level of radio interference 110 in Band A and a minimal level of interference in Band B, illustrated as interference C. In this instance, the wireless controller 302 can seek to mitigate interference when operating in Band A for a broad range of receive signal metrics, while electing to not mitigate interference when operating in Band B. The level of radio frequency interference 110 relative to receive signal levels can determine a preferred operating mode for the hardware circuitry 106 as discussed further herein.

Figure 5:
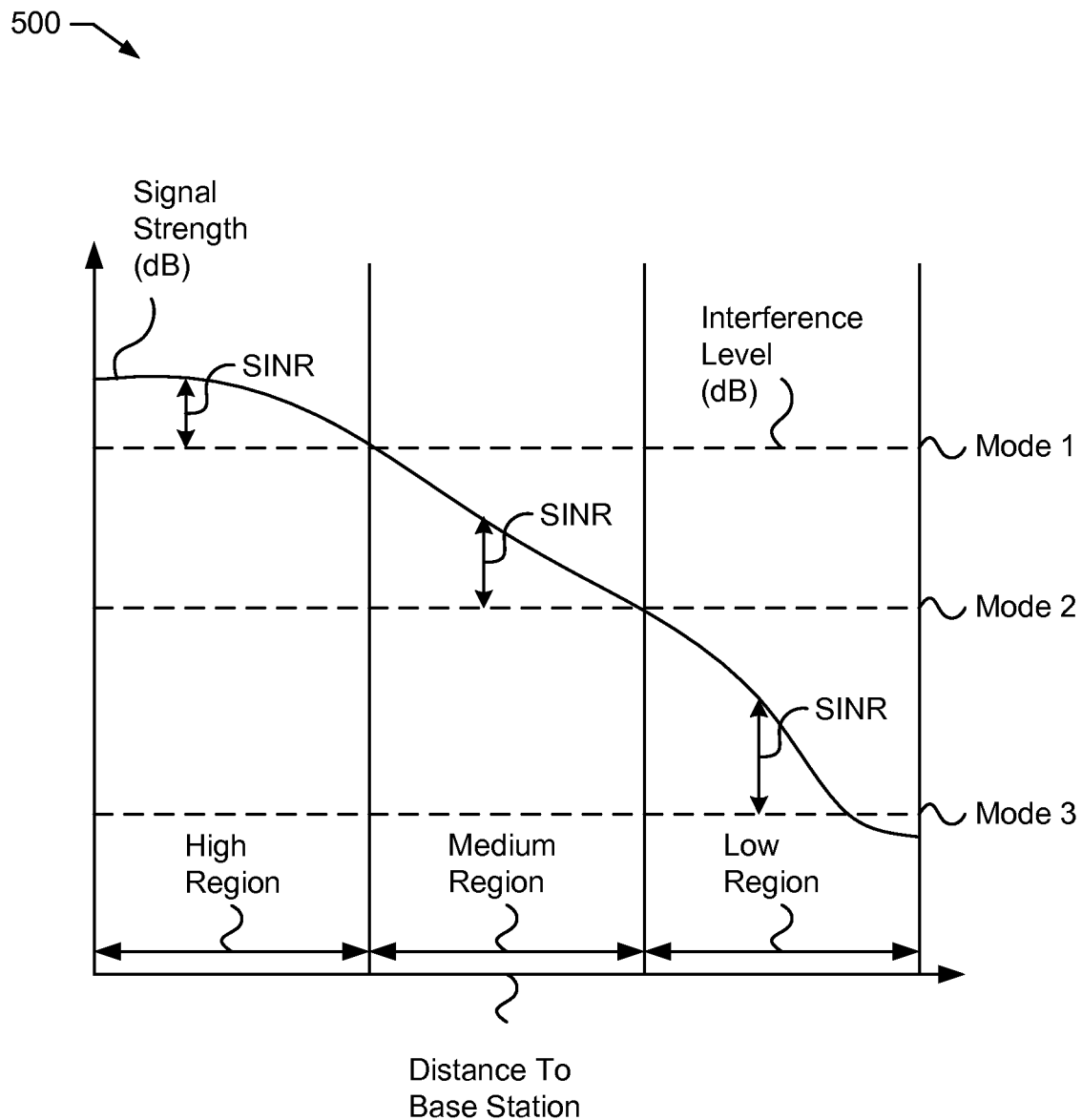
FIG. 5 illustrates a representative signal strength profile relative to different interference levels across a set of regions in accordance with some embodiments.

FIG. 5 illustrates a diagram 500 of a representative receive signal strength profile relative to different levels of radio frequency interference across a set of regions of operation in accordance with some embodiments. As described for FIG. 2, the receive signal strength for the wireless communication device 102 can vary with a distance between the wireless communication device and a base station 202 of the wireless network with which the wireless communication device 102 is connected (or attempting to connect). As illustrated in FIG. 5, the receive signal strength can be higher closer to the base station 202 and can decrease as the wireless communication device 102 operates at distances further from the base station 202. In some embodiments, the wireless controller 302 can divide the operating region of a base station into a set of regions associated with different preferred operating modes 306 for hardware circuitry 106 collocated in the wireless communication device 102 with the wireless circuitry 104. The hardware circuitry 106 can generate different levels of radio frequency interference 110 depending on a different operating mode set for the hardware circuitry 106. FIG. 5 illustrates a representative set of three different operating modes for the hardware circuitry 106, each operating mode resulting in a different level of radio frequency interference 110. In some embodiments, a level of signal to interference plus noise (SINR) can impact performance of the wireless circuitry 104 of the wireless communication device 102. As illustrated in FIG. 5, in a "high" signal strength region, a level of SINR can be at or above a range required for proper operation of the wireless circuitry 104 irrespective of the operating mode of the hardware circuitry 106. For example, the SINR level indicated for the "high" signal strength region can be adequate for operation of the wireless circuitry 104, when the hardware circuitry 106 operates in any of Modes 1, 2 or 3. In an embodiment, the level of interference generated by the hardware circuitry 106 can correspond to operating performance of the hardware circuitry 106, e.g., a higher level of radio frequency interference 110 can be generated when the hardware circuitry 106 operates at a highest performance level. In an embodiment, the wireless controller 302 can provide an indication of a preferred operating mode 306 of "Mode 1" (i.e., at a highest radio frequency interference generating level for the hardware circuitry 106) when the wireless communication device 102 operates in a "high" signal strength region (or when a set of performance metrics is determined to be "high"). The wireless circuitry 104 can "permit" the hardware circuitry 106 to operate with a high level of interference generation, as the wireless circuitry 104 can still perform adequately in this scenario. When the wireless communication device 102 operates in a "medium" signal strength (or other signal metric) region, the wireless controller 302 can provide hardware circuitry an indication of a preferred operating mode 306 of "Mode 2" (i.e., at a lower radio frequency interference generating level for the hardware circuitry 106). As indicated in FIG. 5, the level of SINR when the wireless communication device 102 operates in the "medium" region and the hardware circuitry 106 operates in a "Mode 2" can still provide for adequate performance of the wireless circuitry 104. The "medium" region and "Mode 2" operation of the hardware circuitry 106 provides for maintaining a performance of the wireless circuitry 104 in regions with lower levels of signal strength (or other signal metrics) by altering the operation of the hardware circuitry 106 to mitigate radio frequency interference 110 generated by the hardware circuitry 106. When the wireless communication device 102 operates in a region with "low" receive signal strength (or other signal metrics), the wireless controller 302 can provide an indication of a preferred operating mode 306 of "Mode 3" to the hardware controller 304. The "Mode 3" operating mode can provide for an even lower level of radio frequency interference 110 generated by the hardware circuitry 106 but can also correspond to a reduced performance level for the hardware circuitry 106. The radio frequency interference 110 level in "Mode 3" can allow for proper operation of the wireless circuitry 104 even with low levels of receive signal strength (or other receive signal performance metrics).

Figure 6:
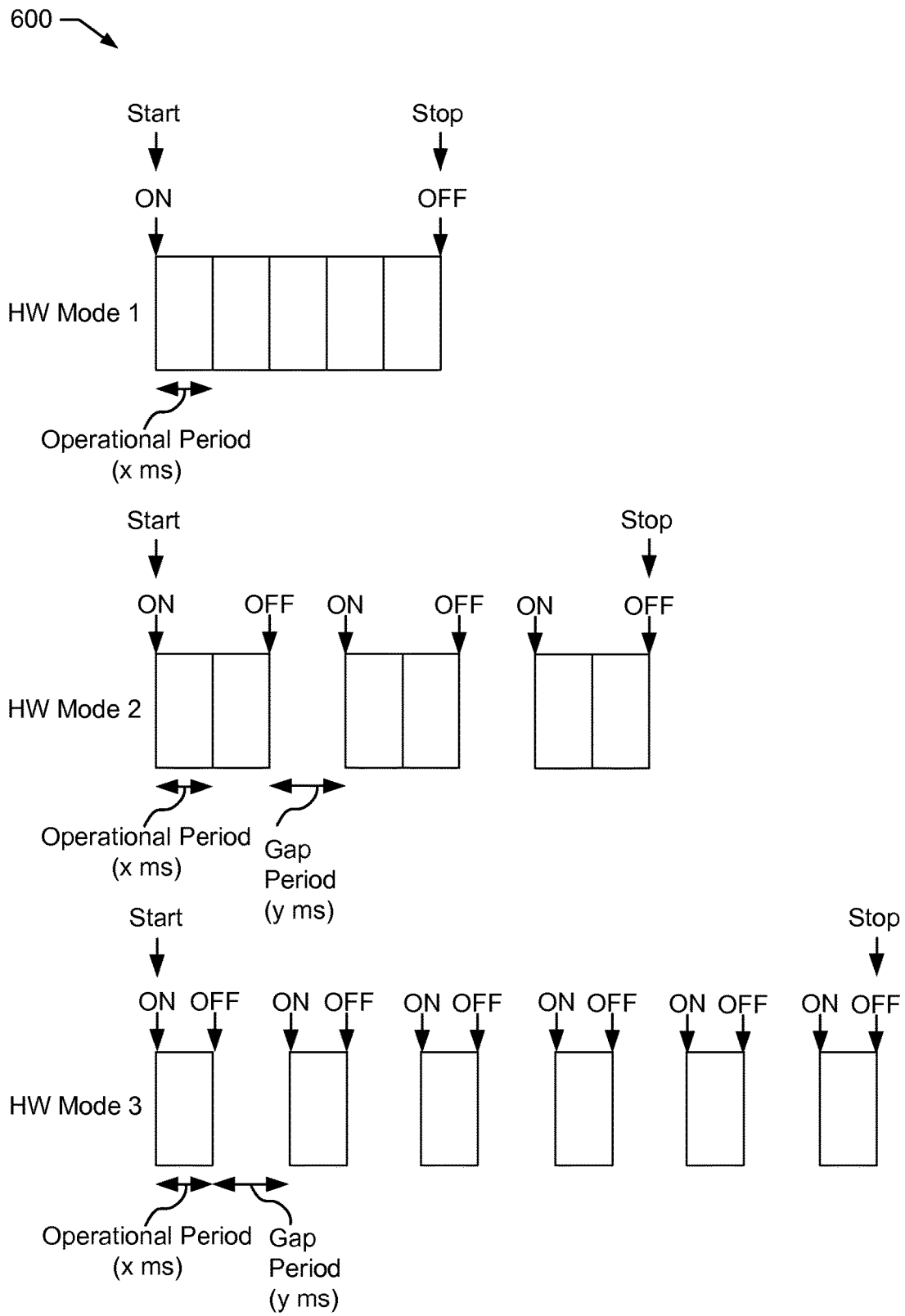
FIG. 6 illustrates a set of representative operational modes for hardware circuitry to mitigate interference with wireless circuitry of the wireless communication device in accordance with some embodiments.

FIG. 6 illustrates a diagram 600 of a set of representative operational modes for hardware circuitry 106 that can mitigate effects of radio frequency interference 110 that can be received by wireless circuitry 104 collocated with the hardware circuitry 106 in the wireless communication device 102. In a first operating mode, "Mode 1", the hardware circuitry 106 can operate continuously to perform a function. In some embodiments, the function can include a number of discrete operational time periods over which a sub-function can be performed. In some embodiments, the hardware circuitry 106 can perform the sub-function for a set period of time, e.g., "x ms". In some embodiments, hardware circuitry 106 can perform the sub-function repeatedly for up to a set number of times to complete (or abort) the function. As illustrated in FIG. 6, the hardware circuitry 106 can initiate operation at a "Start" time, and in some embodiments, the hardware controller 304 can provide an indication to the wireless circuitry 104 when the operation has started (and/or an indication when the operation will start). The hardware circuitry 106 can stop operation of the function at a "Stop" time, and in some embodiments, the hardware controller 304 can provide an indication to the wireless circuitry 104 when the operation has ended (and/or an indication when the operation will end). When operational, the hardware circuitry 106 can generate a level of radio frequency interference 110 that can be received by the wireless circuitry 104 and can interfere with reception of wireless signals depending on a receive signal strength (or other receive signal performance metric). In an embodiment, the hardware circuitry 106 operates most efficiently in a "Mode 1" in which a continuous operation can occur. In an embodiment, the hardware circuitry 106 can generate a highest level of radio frequency interference 110 when operating in the "Mode 1". In some embodiments, the wireless circuitry 104 can indicate that "Mode 1" operation is preferred (or acceptable) when a receive signal strength (or other receive signal metrics) indicate that operation of the wireless circuitry 104 can achieve (and/or is estimated to achieve) an acceptable performance level in the presence of radio frequency interference generated by the hardware circuitry 106 and received by the wireless circuitry 104 while operating the hardware circuitry 106 in "Mode 1". In some embodiments, the wireless controller 302 provides an indication of "Mode 1" as a "preferred" mode of operation when applications running on the wireless communication device that communicate through the wireless circuitry 104 can perform adequately in the presence of radio frequency interference generated by the hardware circuitry 106 when operating concurrently. In some embodiments, real time applications can require a higher level of performance than non real time applications. In some embodiments, a continuous voice connection and/or a video connection can require a relatively "error free" (or an acceptable level of errors) to be considered adequate for operation by the user of the wireless communication device 102. In some embodiments, the wireless controller 302 selects a preferred operating mode for the hardware circuitry 106 based at least in part on applications running concurrently (and/or scheduled to run concurrently) with operation of the hardware circuitry 106. As illustrated in FIG. 6, a second operating mode, "Mode 2" for the hardware circuitry 106 can include gap time periods during which the hardware circuitry 106 can be not generating radio frequency interference 110. When operating in a "Mode 2" the hardware circuitry 106 can generate a level of radio frequency interference 110 that is lower than generated in "Mode 1" when averaged over a period of time. In an embodiment, the instantaneous level of radio frequency interference 110 during an "on" period can be the same for different operating modes, while the average level of radio frequency interference 110 can vary based on different amount of "on" periods and "off" periods. In an embodiment, the length of time of an "on" period can be determined by a requirement for proper operation of a function of the hardware circuitry 106. In some embodiments, the length of time of an "off" period can be determined by a requirement for proper operation of a function of the wireless circuitry 104. In an embodiment, a length of time of the "off" period (or "gap" period) can be selected to provide for adequate error correction of a received packet data unit used by the wireless circuitry 104 for communication with the wireless network. In a representative embodiment, the gap period is set to be at least 12 ms to provide for reception of a 20 ms voice packet. As illustrated in FIG. 6, a length of time for the hardware circuitry 106 to complete a function (time between the "Start" and "Stop" times) can be extended by the "off" (gap) time periods. The time for the function to complete can also be extended based on a less than optimal performance of the hardware circuitry 106 in part due to the introduction of the "off" gap time periods. As shown, the number of operational periods can be higher when operating the hardware circuitry 106 with a set of "off" gap time periods as in "Mode 2" or "Mode 3" than when operating the hardware circuitry 106 continuously as in "Mode 1." FIG. 6 further illustrates another operational mode, "Mode 3", in which the ratio of "on" time periods to "off" time periods is reduced to provide for a longer time period without radio frequency interference 110, which can correspond to a lower average level of radio frequency interference 110 being received by the wireless circuitry 104 when the hardware circuitry 106 is operational (between the "Start" and "Stop" time periods on average). In some embodiments, the hardware controller 304 provides an indication of the "Start" and "Stop" times as well as an indication of the "on" and "off" time periods to the wireless circuitry 104. As illustrated in FIG. 6, the total time for the hardware circuitry 106 to complete a function can be extended further when operating in "Mode 3".

In a representative embodiment, the hardware circuitry 106 includes a sensing device that generates radio frequency energy that interferes with one or more radio frequency bands used by one or more wireless circuitry 104 to connect with a wireless cellular network. The hardware circuitry 106 can provide a scanning function to assist with pattern matching or other identification procedure, e.g., a fingerprint scanner. In an embodiment, each operational time period can comprise 11 ms (or other appropriately matched length of time) during which to scan and capture an image (or a representation thereof). In an embodiment, the length of time for the operational time period is selected to ensure adequate performance of the scanning function. In some embodiments, multiple scans are performed by the hardware circuitry 106, e.g., to provide for fingerprint recognition. In some embodiments, up to a pre-determined maximum number of scans are performed when operating the hardware circuitry 106 continuously (e.g., Mode 1) and a different pre-determined maximum number of scans are performed when operating the hardware circuitry 106 discontinuously (e.g., Modes 2 or 3). In an embodiment, the length of time of an "off" or "gap" between "on" of "scan" time periods can be selected to permit proper operation by wireless circuitry 104 (e.g., cellular wireless circuitry) collocated in the wireless communication device 102 with the hardware "scanning" circuitry 106. In some embodiments, the time period for gaps is selected to provide for decoding with an adequate bit error rate, packet error rate, quality of service, or perceived quality for a particular type of wireless connection, e.g., for a voice call, a video call, a gaming session, or other real time connection. In some embodiments, a length of a packet used for communication by the wireless circuitry 104 can be determined by an underlying radio access technology used for the wireless circuitry 104, and the length of the gap time periods can be accordingly adjusted. In some embodiments, the length of the gap time period depends on a transmission time interval (TTI) used by the wireless circuitry 104 in accordance with a wireless communication protocol. For example, a shorter TTI can be matched to a shorter gap time period, and a longer TTI can be matched to a longer gap time period. In some embodiments, the length of the gap time period can be at least as long as required by the wireless circuitry 104 for adequate performance and can also be at least as short as required by the hardware circuitry 106 for adequate performance thereof. In some embodiments, hardware circuitry 106 can be adjusted for different levels, different bias points, different amplifier settings, and/or other settings that can change an instantaneous amount and/or an average amount of radio frequency interference 110 generated by the hardware circuitry 106.

Figure 7:
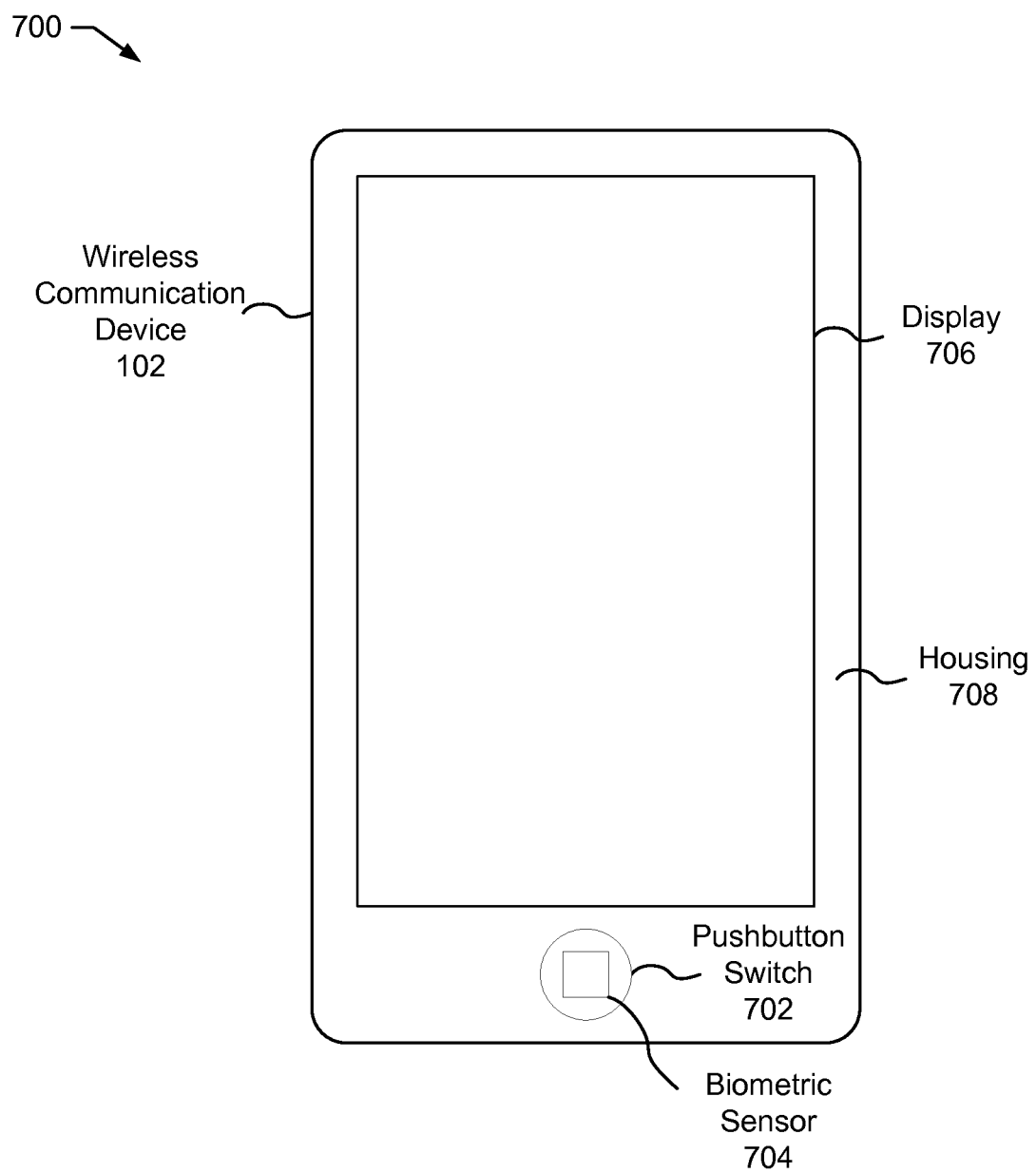
FIG. 7 illustrates a representative wireless communication device including hardware circuitry in accordance with some embodiments.
Figure 8:
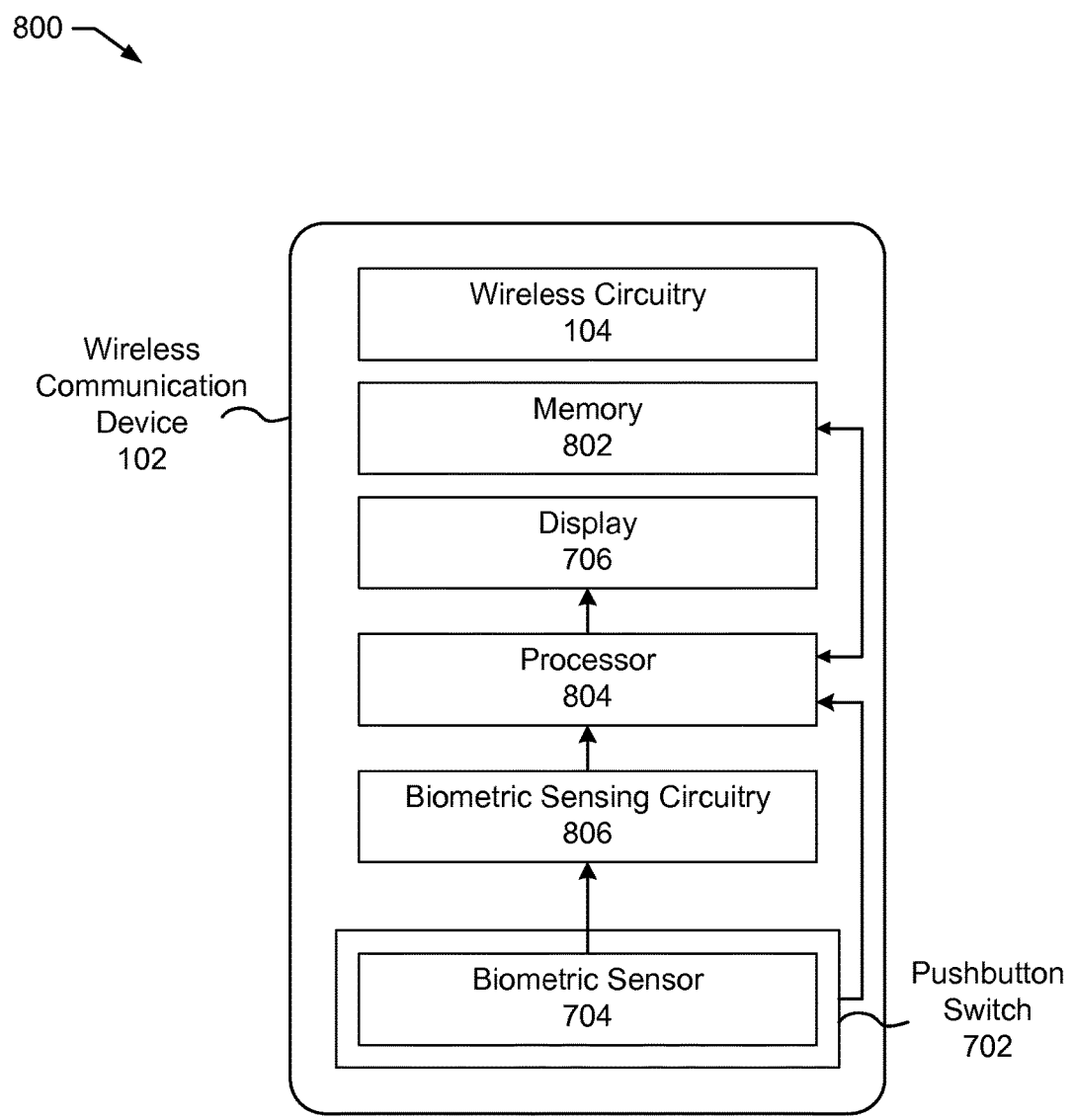
FIG. 8 illustrates portions of a set of hardware circuitry and wireless circuitry included in a wireless communication device in accordance with some embodiments.
Figure 9:
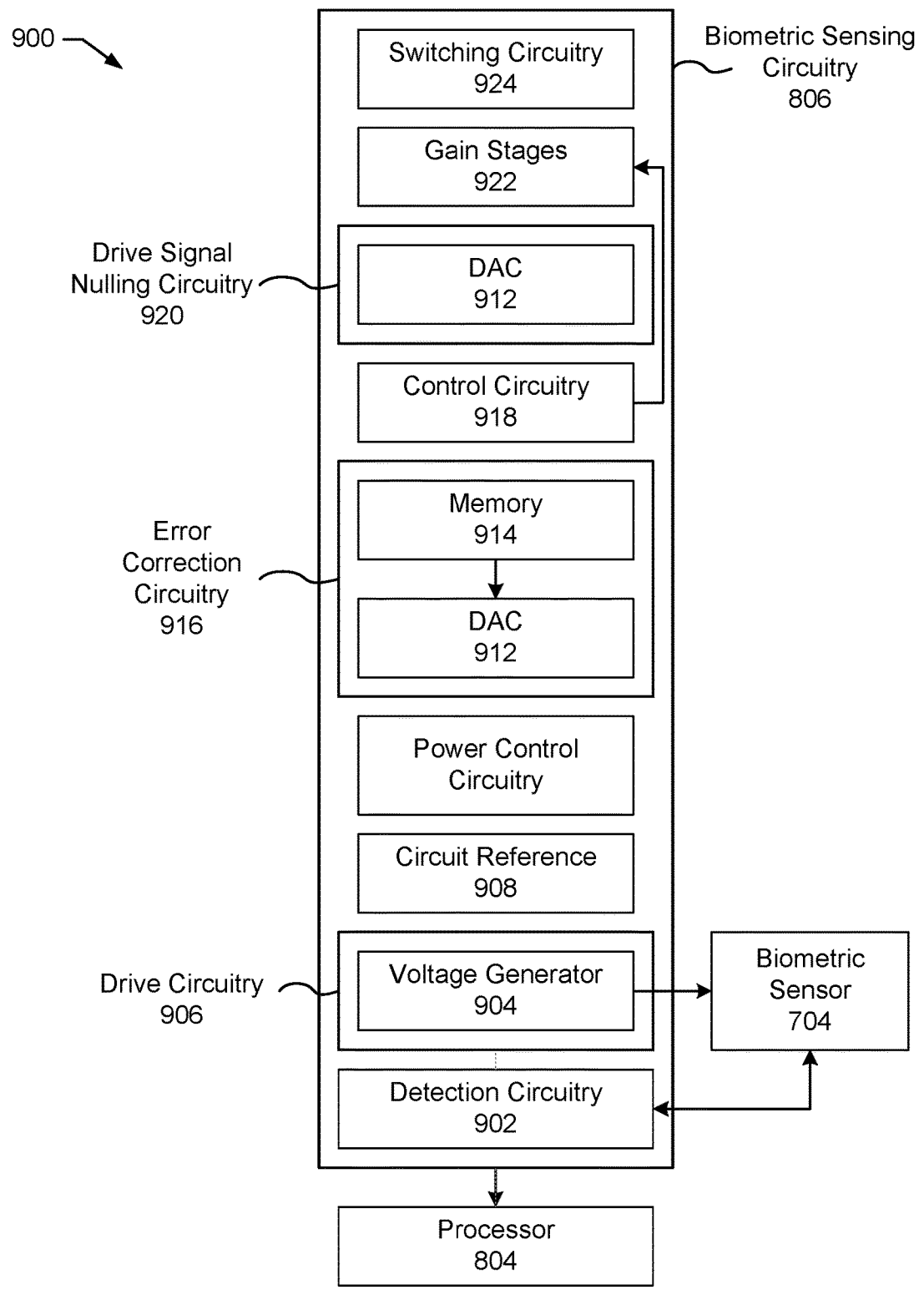
FIG. 9 illustrates additional details for the set of hardware circuitry of the wireless communication device in accordance with some embodiments.

FIG. 7 illustrates a diagram 700 of a set of select hardware elements that can be included in a representative wireless communication device 102. FIG. 8 illustrates a diagram 800 including portions of a set of hardware circuitry 106 and wireless circuitry 104 included in the wireless communication device 102. FIG. 9 illustrates a diagram 900 with additional details for the set of hardware circuitry 106 included in the wireless communication device 102. The wireless communication device 102 can include a housing 708 and one or more processors 804 contained within the housing 708. The wireless communication device 102 can be a cellular telephone, a tablet computer, a laptop computer, or another portable electronic device that can include wireless circuitry 104. In an embodiment, the wireless communication device 102 includes wireless circuitry 104 coupled to the processor 804 and which cooperates with the processor 804 to perform wireless communication functions. The wireless communication device 102 can include a display 706, e.g., a liquid crystal display (LCD), or other display by which information can be presented to the user of the wireless communication device 102. In some embodiments, the display 706 can also include an input capability function by which the user of the wireless communication device 102 can provide inputs to the wireless communication device 102. The wireless communication device 102 can include memory 802 coupled to the processor 804 that can store instructions to be executed by the processor 804. The wireless communication device 102 can also include a finger-operated user input device illustrated in the form of a push-button switch 702, which is also contained in the housing 708 and can be coupled to the processor 804. The push-button switch 702 can cooperate with the processor 804 to perform one or more device functions in response to depression of and/or contact with the push-button switch 702. For example, a device function can include powering on, powering off of the wireless communication device 102, initiation communication through wireless circuitry 104 of the wireless communication device 102, and/or performing a menu function. With respect to the menu function, the processor can change the display 706 to provide a menu of available applications based upon pressing of the push-button switch 702, i.e., the push-button switch can operate as a "home" switch, button, or key. Additional device functions can also be performed based upon the push-button switch 702. In some embodiments, the finger-operated user input device can be provided in a form other than as a push-button switch 702, e.g., forming part of a touch interface for the display 706.

The wireless communication device 102 can include a biometric sensor 704 (e.g., a finger biometric sensing device) that can be provided in the form of one or more integrated circuits. The biometric sensor 704 can include an array of biometric sensing pixel electrodes that can be part of (or coupled to) the push-button switch 702. The biometric sensor 704 can sense a user's finger or an object placed adjacent to the array of finger biometric sensing pixel electrodes carried by the push-button switch 702 so that, in some embodiments, when a user or an object contacts and/or presses downward on the push-button switch 702, data from the user's finger is acquired, for example, for finger matching and/or for spoof detection. The array of finger biometric sensing pixel electrodes can cooperate with circuitry in the wireless communication device 102 to be responsive to static contact or placement of the user's finger or an object adjacent to, directly on, or otherwise contacting thereto. In some embodiments, the array of finger biometric sensing pixel electrodes can be not carried by the push-button switch 702, e.g., the array of finger biometric sensing pixel electrodes can cooperate with circuitry to be responsive to a sliding contact (e.g., for a "slide" sensor) or responsive to a static placement (e.g., for a stand-alone static placement sensor).

In a representative embodiment, the array of finger biometric sensing pixel electrodes can include an 88×88 array of finger sensing pixel electrodes, i.e., the array can be organized into 88 rows of 88 pixels that define a rectangle or square area. The array of finger biometric sensing pixel electrodes can also be of a different size, placement, or arrangement. Each finger sensing pixel electrode can define an electric field sensing pixel as disclosed in U.S. Pat. No. 5,940,526 by Setlak et al., assigned to the present assignee, and the entire contents of which are herein incorporated by reference. Each finger biometric sensing pixel electrode can define another type of finger biometric sensing pixel.

The processor 804 of the wireless communication device 102 can cooperate with the array of finger biometric pixel sensing electrodes to determine a finger match based upon finger biometric data. The processor 804 can determine a finger match based upon enrollment data stored in the device memory 802. The processor 804 can determine a live finder based upon spoof data. The processor 804 can determine a live finger based upon a complex impedance and/or a bulk impedance measurement. In some embodiments, the processor 804 can cooperate with an array of finger biometric pixel sensing electrodes to perform a navigation function or other additional functions as can be appreciated by those skilled in the art.

The biometric sensor 704 can be interconnected with biometric sensing circuitry 806, which can include switching circuitry 924 coupled to the array of finger sensing pixel electrodes in the biometric sensor 704 (or coupled thereto) and also coupled to a set of gain stages 922 for amplifying signals. The switching circuitry 924 can be capable of acquiring finger biometric data from each of a plurality of sub-arrays of the array of finger biometric sensing pixel electrodes in the biometric sensor 704. The switching circuitry 924 can be able to sequentially generate output data for adjacent regions of the array of finger biometric sensing pixel electrodes or sub-arrays of the biometric sensor 704. In an 88×88 finger biometric pixel sensing electrode array of the biometric sensor 704, a total of 7744 finger biometric sensing pixel electrodes can be used in cooperation with a set of corresponding switches in the switching circuitry 924. In some embodiments, additional switches can be used.

The biometric sensing circuitry 806 can include drive circuitry 906 capable of generating a drive signal coupled to the array of finger sensing pixel electrodes of the biometric sensor 704. The array of finger sensing pixel electrodes of the biometric sensor 704 can cooperate with the drive circuitry 906 to generate a detected signal based upon placement of a finger adjacent to the array of finger sensing pixel electrodes. A set of gain stages 922 can be coupled together in series and define a set of summing nodes between a pair of adjacent ones of the gain stages. A summing node can be coupled to the end of a fourth gain stage. A first gain stage of the set of gain stages 922 can be provided in the form of one or more variable gain amplifiers that define a set of front end amplifiers, each respectively coupled to a finger sensing electrode from the array of finger sensing electrodes of the biometric sensor 704. The first gain stage can include as an input a detected signal at a "raw" signal level. The output of the first gain stage can be coupled to a first summing node. For an eight-channel implementation (e.g., as can be provided for an 88×88 array of finger sensing pixel electrodes divided into a set of eleven 8×8 regions), there can be eight instances of a first gain stage. A second gain stage can also be provided in the form of one or more variable gain amplifiers defining AC amplifiers. Each amplifier of the second gain stage can have an input coupled to the first summing node. A capacitor or other impedance device can be coupled between the first summing node and the second gain stage. The second gain stage can also process the input signal at a raw signal level. For an eight-channel implementation (e.g., for an 88×88 array of finger sensing pixel electrodes of the biometric sensor 704 divided into eleven 8×8 regions) there can be eight instances of the second gain stage. The third gain stage can be provided in the form of one or more variable gain amplifiers that define a correlated double sampler (CDS). The third gain stage can include odd and even variable gain amplifiers for each channel. For an eight-channel implementation, there can be eight instances of the third gain stage. The output of each of the odd and even variable gain amplifiers of the third gain stage can be input to a multiplexer, which can be a 16 to 1 multiplexer for an eight-channel implementation. The output of the multiplexer can be summed at a second summing node with an output from a digital-to-analog converter (DAC). The third gain stage can process the input signal at a "raw" signal level. A fourth gain stage can be provided in the form of one or more variable gain amplifiers. The variable gain amplifier can have an input coupled to the second summing node and an output coupled to a third summing node. The fourth gain stage can process the input signal at a "feature" signal level. While four gain stages are described, in some embodiments, additional gain stages can be used.

Drive circuitry 906 of the biometric sensing circuitry 806 can include a finger coupling electrode (not shown) adjacent to the array of finger sensing pixel electrodes of the biometric sensor 704. The drive circuitry 906 can include a drive signal generator, which can be provided in the form of a voltage generator 904, coupled to the finger coupling electrode adjacent to the biometric sensor 704. The array of finger sensing pixel electrodes of the biometric sensor 704 and the gain stages 922 of the biometric sensing circuitry 806 can include a circuit reference 908 associated therewith. The circuit reference 908 can be coupled to a device ground (not shown) so that the voltage generator 904 can drive the finger coupling electrode with respect to the circuit reference 908 and the device ground. The biometric sensing circuitry 806 can include drive signal nulling circuitry 920 coupled to the gain stages 922. A relatively high voltage drive signal can result in a relatively large common mode voltage appearing on the detected signal generated from the array of finger biometric sensing pixel electrodes of the biometric sensor 704. As the drive signal generally can carry no useful information, it can be desirable to reduce or eliminate the drive signal as early as possible in the signal chain. In particular, small spatial variations in electric field intensity in the presence of a relatively large average field intensity can be measured.

The drive signal nulling circuitry 920 can be able to reduce the relatively large drive signal component from the detected signal. The drive signal nulling circuitry 920 can include a digital-to-analog converter (DAC) 912 that can generate an inverted scaled replica of the drive signal for the gain stages 922. The DAC 912 can be coupled to the first summing node. A memory 914 can be coupled to the DAC 912 included in error correction circuitry 916 of the biometric sensing circuitry 806. In some embodiments, the drive signal nulling circuitry 920 can include an inverting amplifier and impedances coupled thereto. In such drive signal nulling circuitry 920, a sense amplifier (e.g., a first gain stage) can be a differential amplifier and can be configured to operate as an operational amplifier summation device. A summing node can be connected to a finger sensing pixel electrode through an impedance that can be relatively large (e.g., a small capacitor) and also to an inverted version of the pixel drive signal (e.g., a drive signal cancellation signal) also through a summing impedance. The summing impedances can be considered drive signal cancellation summing impedances. Other impedances can also exist, for example, a finger coupling electrode impedance coupled between the user's finger and the finger coupling electrode, which in turn can be coupled to a device ground. A finger impedance can exist between a finger sensing biometric sensing pixel electrode of the biometric sensor 704 and a substrate of a first integrated circuit. A reference impedance can be coupled between the circuit ground of a second integrated circuit and the non-inverting input of an amplifier of the second integrated circuit. The impedance can be coupled across the output and the inverting input of an amplifier. A voltage regulator can be coupled between a voltage supply and the circuit ground, which can be coupled to the device ground. The biometric sensing circuitry 806 can further include detection circuitry 902 coupling the biometric sensor 704 with the processor 804.

The large drive signal on the sensor plate of each finger sensing biometric sensing pixel electrode of the biometric sensor 704 and the drive cancellation signal can balance at the current summing node of the amplifier so that the signals at the amplifier can comprise a set of relatively low voltage signals with a relatively high voltage drive signal removed. The components that can have high voltage capability can be those that generate high voltage drive signals. None of the measurement circuitry can require high voltage capabilities. The drive circuitry 906 can be able to generate a square wave at an amplitude in a range of 10 to 20 volts at a frequency in a range of 1 to 5 MHz, in some embodiments. The drive circuitry 906 can be able to generate a different type of waveform signal having a different amplitude range and in a different frequency range as can be appreciated by those skilled in the art. A relatively high voltage drive signal can be managed by floating a ground of an amplifier in a first gain state, e.g., in a sense amplifier, and by connecting it to a drive signal.

In some embodiments, the hardware circuitry 106 of the wireless communication device 102 includes all or portions of the circuitry described herein for providing a finger biometric sensing function. In some embodiments, the biometric sensor 704 can produce an amount of radio frequency interference 110 that can interfere with operation of a cellular receiver in the wireless circuitry 104. In some embodiments, control circuitry can be included to modify operation of the biometric sensor 704 and/or of associated electronics coupled to the biometric sensor 704 in order to mitigate the effect of radio frequency interference 110 generated by the operation of the biometric sensor and/or the accompanying biometric sensing circuitry 806. In some embodiments, the processor 804 can provide a controlling function for operation of the biometric sensor 704 and/or the biometric sensing circuitry 806 directly or indirectly. In some embodiments, the biometric sensor 704 and/or the biometric sensing circuitry 806 can be configured to operate in different modes. In some embodiments, the biometric sensor 704 and/or the biometric sensing circuitry 806 can be configured to operate in accordance with a preferred operating mode provided by the wireless controller 302. In some embodiments, the biometric sensor 704 and/or the biometric sensing circuitry 806 can be configured to operate with "on" periods and "off" periods to minimize and/or mitigate the effect of radio frequency interference 110 generated by the biometric sensor 704 and/or the accompanying biometric sensing circuitry 806. In some embodiments, one or more amplifiers or other hardware elements of the biometric sensor and/or biometric sensing circuitry can be adjusted to operate in different modes to change an amount of radio frequency interference 110 generated therefrom. In some embodiments, the wireless communication device 102 includes one or more processors, e.g., the processor 804, the wireless controller 302, and/or the hardware controller 304 configured to operate cooperatively to provide for proper operation of the wireless circuitry 104 and the hardware circuitry 106 concurrently. In some embodiments, one or more settings of the wireless circuitry 104 are adjusted to accommodate the hardware circuitry 106, e.g., as indicated based on one or more operating states 308 of the hardware circuitry 106. In some embodiments, one or more settings of the hardware circuitry 106 are adjusted to accommodate the wireless circuitry 104, e.g., as indicated based on one or more preferred operating modes 306 provided to the hardware circuitry 106 by the wireless circuitry 104 directly or indirectly through one or more processors.

Figure 10:
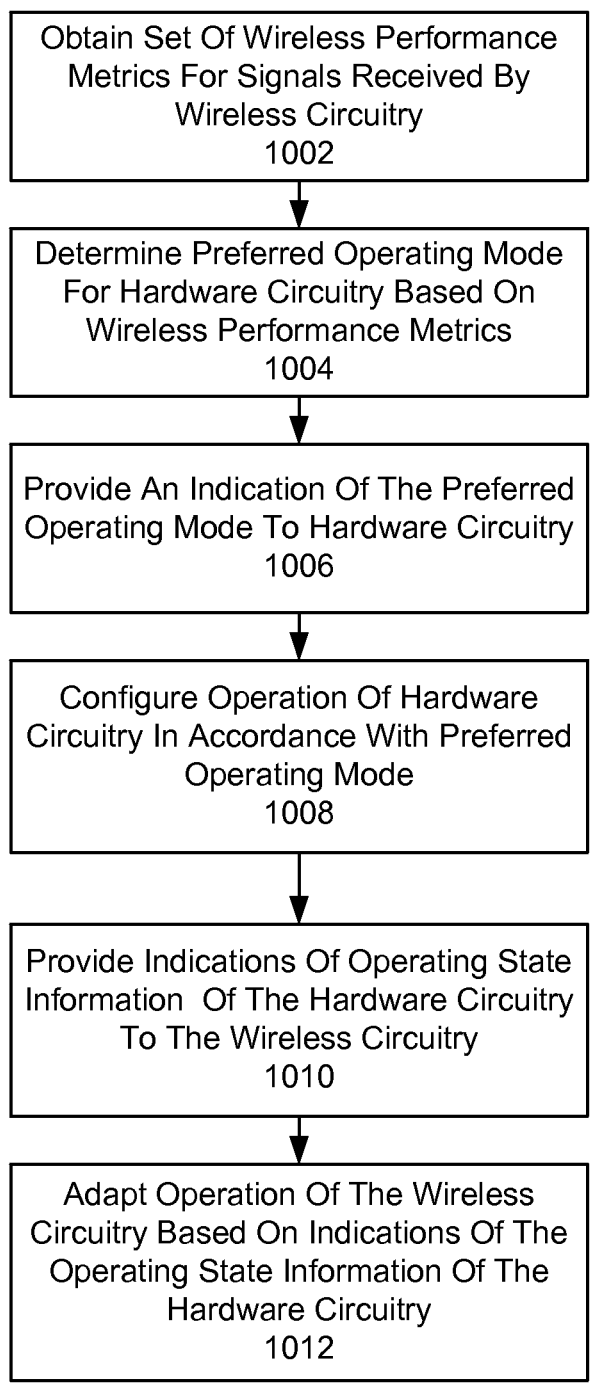
FIG. 10 illustrates a representative method to mitigate radio frequency interference between hardware circuitry and wireless circuitry of the wireless communication device in accordance with some embodiments.

FIG. 10 illustrates a representative method 1000 to mitigate the effects of radio frequency interference between hardware circuitry 106 and wireless circuitry 104 in the wireless communication device 102. In step 1002, the wireless circuitry 104 receives a set of radio frequency signals and obtains a set of performance metrics for the received radio frequency signals. In some embodiments, the wireless controller 302 of the wireless circuitry 104 determines the set of performance metrics, while in other embodiments another processor within the wireless communication device 102 associated with and/or coupled to the wireless circuitry 104 determines the set of performance metrics. In some embodiments, representative performance metrics for radio frequency signals received by the wireless communication device 102 can include signal strength, signal quality, bit error rate, packet error rate, or other metrics by which performance of the wireless circuitry 104 can be gauged. In some embodiments, the set of performance metrics are selected in accordance with one or more applications running (or configured to run) on the wireless communication device 102 and communicate with a wireless network through the wireless circuitry 104. In step 1004, the wireless controller 302 of the wireless circuitry 104 determines a preferred operating mode for the hardware circuitry 106 based at least in part on the set of performance metrics for the received radio frequency signals. In some embodiments, the preferred operating mode for the hardware circuitry 106 is determined based additionally on one or more applications active on the wireless communication device 102. In some embodiments, the preferred operating mode for the hardware circuitry 106 is determined based additionally on a user preference for one or more of: operating settings of the hardware circuitry, operating settings for applications, prioritization of applications, and prioritization of performance versus power savings. In step 1006, the wireless circuitry 104 provides a first indication of the preferred operating mode to the hardware circuitry 106. In some embodiments, the wireless controller 302 of the wireless circuitry 104 provides the first indication to a hardware controller 304 of the hardware circuitry 106 in the wireless communication device 102. In some embodiments, the wireless circuitry 104 provides the first indication to a control processor 312, which in turn provides the preferred operating state indication to the hardware circuitry 106. In step 1008, the hardware circuitry 106 is configured for operation in accordance with the preferred operating mode provided by the first indication from the wireless circuitry 104. In some embodiments, the hardware circuitry 106 determines a configuration based on the preferred operating mode and on additional factors including one or more of: applications running on the wireless communication device 102, applications using the wireless circuitry 104, applications using (or expected to use during operation of) the hardware circuitry 106, a powered state of the wireless communication device 102, a battery level of the wireless communication device 102, a display operational state of the wireless communication device 102, a set of user preferences for operation of the wireless circuitry 104 and/or the hardware circuitry 106, a set of user preferences for prioritization of applications, and a set of user preferences for prioritization of operational performance of the wireless circuitry 104 and/or the hardware circuitry 106 relative to power savings. In some embodiments, the hardware circuitry 106 is configured to provide minimal radio frequency interference that can be received by the wireless circuitry 104 when the hardware circuitry 106 is operational. In some embodiments, the hardware circuitry 106 is configured to provide a lower level of radio frequency interference generated by the hardware circuitry 106 than when operating at a maximum performance level. In some embodiments, hardware circuitry 106 is configured to cycle on and off during operation of the hardware circuitry 106 to provide for quiet time periods during which minimal or no radio frequency interference can be generated by the hardware circuitry 106. In some embodiments, a proportion of on time periods and off time periods during operation of the hardware circuitry 106 is determined based on the preferred operating mode indicated by the wireless circuitry 104. In step 1010, the hardware circuitry 106 provides a second indication to the wireless circuitry 104 when the hardware circuitry 106 initiates and operation and also when the hardware circuitry 106 terminates an operation that can cause radio frequency interference to the wireless circuitry 104. In some embodiments, the hardware circuitry 106 provides an indication of a start time and of a stop time to the wireless circuitry 104 for an operation of the hardware circuitry 106. In some embodiments, the hardware circuitry 106 provides an indication of one or more "on" time periods and an indication of one or more "off" time periods during operation of the hardware circuitry 106 to the wireless circuitry 104. In some embodiments, the hardware circuitry 106 provides an indication of a percentage of "on" time periods to "off" time periods for an operation of the hardware circuitry 106 to the wireless circuitry 104. In step 1012, the wireless circuitry 104 is configured to mitigate one or more effects of radio frequency interference at least during a portion of a time period during which the hardware circuitry 106 is operational. In some embodiments, the wireless circuitry 104 enables a plurality of antennas to provide for receive diversity to improve performance of signal reception in the presence of radio frequency interference generated by the hardware circuitry 106. In some embodiments, the wireless circuitry 104 configures one or more parameters for one or more wireless connections based on the second indication provided from the hardware circuitry, the one or more parameters selected from the set including: a data rate, a data reliability setting, a quality of service, an error correction parameter, and a signal power level setting. In some embodiments, the wireless circuitry 104 configures use of one or more antennas to mitigate effects of radio frequency interference from the hardware circuitry 106, e.g., selecting to use one or more particular antennas alone or in combination through which to receive radio frequency signals from a wireless network to which the wireless communication device 102 is connected and/or attempting to connect.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium for controlling operation of a wireless communication device. The computer readable medium is any data storage device that can store data that can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A wireless communication device comprising:
wireless circuitry including a wireless controller; and
biometric sensor hardware circuitry including a hardware controller communicatively coupled to the wireless controller,
wherein the wireless controller is configured to:
determine a preferred operating mode from multiple operating modes for the biometric sensor hardware circuitry based at least in part on (i) a set of applications running concurrently or scheduled to run concurrently with operation of the biometric sensor hardware circuitry on the wireless communication device and (ii) a set of wireless performance metrics that include at least one wireless performance metric for at least one application in the set of applications, and
provide an indication of the preferred operating mode for the biometric sensor hardware circuitry to the hardware controller, and
adapt operation of the wireless circuitry based on a sequence of indications corresponding to a sequence of consecutive alternating "on" and "off" operating states of the preferred operating mode of the biometric sensor hardware circuitry to mitigate effects of radio frequency interference received by the wireless circuitry caused by operation of the biometric sensor hardware circuitry; and
wherein the hardware controller is configured to:
determine operation for the biometric sensor hardware circuitry based on the indication of the preferred operating mode to mitigate an amount of interference generated by the biometric sensor hardware circuitry while operational, the preferred operating mode comprising the sequence of consecutive alternating "on" and "off" operating states of the biometric sensor hardware circuitry to perform a scanning function; and
provide the sequence of indications corresponding to the preferred operating mode to the wireless controller;
wherein the multiple operating modes comprise:
a first operating mode in which operation of the biometric sensor hardware circuitry is in the "on" operating state continuously for a first time period, and
a second operating mode having a sequence of consecutive alternating "on" and "off" operating states of the biometric sensor hardware circuitry in which operation of the biometric sensor hardware circuitry is in the "on" operating state for a plurality of "on" time periods, each "on" time period shorter than the first time period.

2. The wireless communication device of claim 1, wherein the wireless circuitry further comprises a plurality of antennas, and the wireless controller is further configured to:
enable receive diversity for the plurality of antennas in response to an indication that the biometric sensor hardware circuitry operates in an "on" operating state; and
disable receive diversity for the plurality of antennas in response to an indication that the biometric sensor hardware circuitry operates in an "off" operating state.

3. The wireless communication device of claim 1, wherein the wireless circuitry further comprises a plurality of antennas, and wherein the wireless controller is configured to enable or disable receive diversity for the plurality of antennas based on both the indications of the "on" and "off" operating states of the biometric sensor hardware circuitry and on a powering mode of the wireless communication device.

4. The wireless communication device of claim 1, wherein the wireless circuitry further comprises a plurality of antennas, and wherein the wireless controller enables receive diversity for the plurality of antennas when the wireless communication device is powered through an external power source.

5. The wireless communication device of claim 1, wherein the biometric sensor hardware circuitry is configurable to operate in the first operating mode in which operation of the biometric sensor hardware circuitry is in the "on" operating state continuously for the first time period to perform the scanning function and the second operating mode in which operation of the biometric sensor hardware circuitry alternates between the "on" operating state and the "off" operating state for a second time period longer than the first time period to perform a scanning sub-function repeatedly during the "on" operating states for up to a set number of times to complete performance of the scanning function over the second time period.

6. The wireless communication device of claim 5, wherein the wireless circuitry indicates the preferred operating mode is, from the multiple operating modes, the first operating mode when the set of wireless performance metrics for the set of applications satisfy corresponding performance thresholds and the second operating mode when a wireless performance metric for an application of the set of applications does not satisfy a corresponding performance threshold.

7. The wireless communication device of claim 1, wherein the wireless controller is further configured to monitor wireless receive performance comprising one or more of a receive signal quality, a receive signal strength, a bit error rate, and a packet error rate and determine the preferred operating mode of the biometric sensor hardware circuitry based on the monitored wireless receive performance.

8. The wireless communication device of claim 1, wherein the wireless controller determines the preferred operating mode of the biometric sensor hardware circuitry based on an estimate of radio frequency interference from the biometric sensor hardware circuitry for one or more frequency bands used by the wireless circuitry concurrently with operation of the biometric sensor hardware circuitry.

9. The wireless communication device of claim 1, wherein a length of time for any of the "on" operating states is based on requirements for operation of the biometric sensor hardware circuitry to perform the scanning function and a length of time for any of the "off" operating states is based on requirements for operation of the wireless circuitry to satisfy the at least one wireless performance metric for the at least one application.

10. A method of interference mitigation to facilitate coexistence of biometric sensor hardware circuitry and wireless circuitry in a wireless communication device, the method comprising:
by the wireless communication device:
determining a preferred operating mode from multiple operating modes for the biometric sensor hardware circuitry based at least in part on (i) a set of applications running concurrently or scheduled to run concurrently with operation of the biometric sensor hardware circuitry on the wireless communication device and (ii) a set of wireless performance metrics that include at least one wireless performance metric for at least one application in the set of applications;
providing an indication of the preferred operating mode to the biometric sensor hardware circuitry;
configuring operation of the biometric sensor hardware circuitry to operate in accordance with the preferred operating mode, the preferred operating mode comprising a corresponding sequence of consecutive alternating "on" and "off" operating states of the biometric sensor hardware circuitry to perform a scanning function;
providing indications of the corresponding sequence of the preferred operating mode of the biometric sensor hardware circuitry to the wireless circuitry; and
adapting operation of the wireless circuitry based on the indications of the sequence of consecutive alternating "on" and "off" operating states of the biometric sensor hardware circuitry to mitigate effects of radio frequency interference received by the wireless circuitry caused by operation of the biometric sensor hardware circuitry;
wherein the multiple operating modes comprise:
a first operating mode in which operation of the biometric sensor hardware circuitry is in the "on" operating state continuously for a first time period; and
a second operating mode having a sequence of consecutive alternating "on" and "off" operating states of the biometric sensor hardware circuitry in which operation of the biometric sensor hardware circuitry is in the "on" operating state for a plurality of "on" time periods, each "on" time period shorter than the first time period.

11. The method of claim 10, wherein the wireless communication device determines the preferred operating mode of the multiple operating modes for the biometric sensor hardware circuitry based on user preferences for one or more of: operating settings of the biometric sensor hardware circuitry, operating settings for one or more applications of the set of applications, and a prioritization of operational performance versus power consumption.

12. The method of claim 10, wherein the wireless communication device adapts operation of the wireless circuitry to mitigate radio frequency interference from the biometric sensor hardware circuitry by enabling and disabling receive diversity for a plurality of antennas of the wireless circuitry.

13. The method of claim 10, wherein the wireless communication device adapts operation of the wireless circuitry by one or more of: changing a data rate for an application that communicates data through the wireless circuitry, delaying transmission and/or reception of one or more data packets to time periods of lower radio frequency interference, and changing timing of signaling via the wireless circuitry to minimize received radio frequency interference.

14. The method of claim 10, wherein the wireless communication device provides indications of the sequence of consecutive alternating "on" and "off" operating states of the biometric sensor hardware circuitry to the wireless circuitry by providing indications of a start time and a stop time for one or more "on" time periods when the biometric sensor hardware circuitry operates in the "on" operating state to perform the scanning function.

15. The method of claim 10, wherein the set of wireless performance metrics comprises one or more of: a receive signal strength, a receive signal quality, and a decoding error rate, and the wireless communication device determines the preferred operating mode for the biometric sensor hardware circuitry to reduce a length of time periods of the "on" operating states of the biometric sensor hardware circuitry when the set of wireless performance metrics does not satisfy a set of performance metrics.

16. The method of claim 10, wherein the biometric sensor hardware circuitry is configurable to operate in the first operating mode of continuous operation of the biometric sensor hardware circuitry in the "on" operating state for the first time period to perform the scanning function and the second operating mode of discontinuous pulsed operation of the biometric sensor hardware circuitry alternating between the "on" and "off" operating states for a second time period that is longer than the first time period to perform a scanning sub-function repeatedly during the "on" operating states for up to a set number of times to complete performance of the scanning function over the second time period.

17. The method of claim 16, wherein the wireless communication device determines the preferred operating mode, from the multiple operating modes, for the biometric sensor hardware circuitry to be the first operating mode of continuous operation when the set of wireless performance metrics for the set of applications satisfy a set of corresponding performance thresholds and the second operating mode of discontinuous pulsed operation when the set of wireless performance metrics for the set of applications does not satisfy the set of corresponding performance thresholds.

18. The method of claim 16, wherein the wireless communication device determines the preferred operating mode for the biometric sensor hardware circuitry to be the first operating mode of continuous operation when the set of applications running concurrently or scheduled to run concurrently with operation of the biometric sensor hardware circuitry on the wireless communication device satisfy corresponding wireless performance metrics when the biometric sensor hardware circuitry operates in the first operating mode of continuous operation.

19. The method of claim 16, wherein the wireless communication device determines the preferred operating mode for the biometric sensor hardware circuitry to be the second operating mode of discontinuous pulsed operation when at least one application in the set of applications running concurrently or scheduled to run concurrently with operation of the biometric sensor hardware circuitry on the wireless communication device does not satisfy corresponding performance metrics when the biometric sensor hardware circuitry operates in the first operating mode of continuous operation.

20. A non-transitory machine-readable medium storing one or more sequences of instructions for facilitating coexistence of biometric sensor hardware circuitry and wireless circuitry in a wireless communication device, wherein execution of the one or more sequences of instructions by one or more processors in the wireless communication device, cause the wireless communication device to:
  determine a preferred mode of operation from multiple modes of operation for the biometric sensor hardware circuitry based at least in part on (i) a set of applications running concurrently or scheduled to run concurrently with operation of the biometric sensor hardware circuitry on the wireless communication device and (ii) a set of wireless performance metrics that include at least one wireless performance metric for at least one application in the set of applications;
  provide the preferred mode of operation to the biometric sensor hardware circuitry;
  configure operation of the biometric sensor hardware circuitry to use the preferred mode of operation provided to mitigate an amount of interference generated by the biometric sensor hardware circuitry while operational, the preferred operating mode comprising a corresponding sequence of consecutive alternating "on" and "off" operating states of the biometric sensor hardware circuitry to perform a scanning function;
  provide indications of the sequence of consecutive alternating "on" and "off" operating states corresponding to the preferred mode of operation of the biometric sensor hardware circuitry to the wireless circuitry; and
  adapt operation of the wireless circuitry based on the indications of the sequence of consecutive alternating "on" and "off" operating states of the biometric sensor hardware circuitry corresponding to the preferred mode of operation to mitigate effects of radio frequency interference received by the wireless circuitry caused by operation of the biometric sensor hardware circuitry;
  wherein the multiple modes of operation comprise:
    a first mode of operation in which the biometric sensor hardware circuitry is in the "on" operating state continuously for a first time period, and
    a second mode of operation having a sequence of consecutive alternating "on" and "off" operating states in which the biometric circuitry is in the "on" operating state for a plurality of "on" time periods, each "on" time period shorter than the first time period.

* * * * *